United States Patent
Mishra et al.

(10) Patent No.: US 12,443,217 B2
(45) Date of Patent: Oct. 14, 2025

(54) TIME ACTUATED TRIGGERS FOR A RADIO FREQUENCY FRONT END

(71) Applicant: QUALCOMM Incorporated, San Diego, CA (US)

(72) Inventors: Lalan Jee Mishra, Escondido, CA (US); Umesh Srikantiah, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 18/449,567

(22) Filed: Aug. 14, 2023

(65) Prior Publication Data

US 2025/0060776 A1  Feb. 20, 2025

(51) Int. Cl.
*G06F 1/08* (2006.01)

(52) U.S. Cl.
CPC ................................. *G06F 1/08* (2013.01)

(58) Field of Classification Search
CPC ..... G06F 1/08; G06F 1/10; G06F 1/04; G06F 1/12; G06F 1/14; G06F 13/42; G06F 13/4282; G06F 13/4291; G06F 13/4295
See application file for complete search history.

(56) References Cited

U.S. PATENT DOCUMENTS

| | | | |
|---|---|---|---|
| 2008/0018486 A1* | 1/2008 | Terasawa | G06F 13/4291 340/636.1 |
| 2015/0074306 A1* | 3/2015 | Ayyagari | G06F 13/4072 710/110 |
| 2015/0193297 A1 | 7/2015 | Ngo et al. | |
| 2016/0358617 A1 | 12/2016 | Lesso et al. | |
| 2019/0302830 A1 | 10/2019 | Chen et al. | |
| 2020/0081859 A1* | 3/2020 | Mishra | G06F 13/4054 |
| 2020/0083875 A1* | 3/2020 | Mishra | H03K 5/003 |
| 2020/0280841 A1* | 9/2020 | Liu | H04W 76/10 |

OTHER PUBLICATIONS

International Search Report and Written Opinion—PCT/US2024/035810—ISA/EPO—Oct. 1, 2024.

* cited by examiner

*Primary Examiner* — Raymond N Phan
(74) *Attorney, Agent, or Firm* — Loza & Loza, LLP

(57) ABSTRACT

A receiving device, comprising: a clock generator circuit configured to generate a base clock signal; a counter configured to count cycles or edges of the base clock signal while a measurement pulse is received over a one-wire serial bus during a first transaction conducted over the one-wire serial bus, the measurement pulse having a pulse duration defined by a number of clock cycles of a transmitter clock signal; and a controller configured to adjust a count value of the counter when the counter is timing actuation of a trigger using a correction value that represents a difference between the cycles or edges of the base clock signal counted while the measurement pulse was being received and the number of clock cycles of the transmitter clock signal that defines the pulse duration.

30 Claims, 19 Drawing Sheets

TIME ACTUATED TRIGGERS FOR A RADIO FREQUENCY FRONT END

TECHNICAL FIELD

The present disclosure relates generally to serial communication and, more particularly, to management of trigger timing in receivers coupled to a communication bus that supports one-wire and two-wire peripheral devices.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a two-wire multi-drop serial bus is operated in accordance with an Inter-Integrated Circuit (I2C or I²C) protocol, which was developed to connect low-speed peripherals to a processor. An I2C bus provides a Serial Data Line (SDA) that carries a data signal, and a Serial Clock Line (SCL) that carries a clock signal. In another example, the Improved Inter-Integrated Circuit (I3C) protocols defined by the Mobile Industry Processor Interface (MIPI) Alliance derive certain implementation aspects from the I2C protocol including separate clock and data lines. In another example, the Radio Frequency Front-End (RFFE) interface defined by the MIPI Alliance provides a communication interface for controlling various radio frequency (RF) front-end devices, including power amplifiers (PAs), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. In another example, the system power management interface (SPMI) defined by the MIPI Alliance provides a hardware interface that may be implemented between baseband or application processors and peripheral components for purposes that include power management within a device.

The use of MIPI-defined serial buses in place of parallel buses can reduce the number of physical general-purpose input/output (GPIO) pins required to support communication between multiple devices. However, as device complexity increases, demand for GPIO pins also increases and there is demand for more simplified bus architectures, including bus architectures that support communication through a single GPIO pin and over a single wire. There is a related demand for improved timing management techniques when a clock signal is not transmitted over a dedicated wire of a serial bus.

SUMMARY

Certain aspects of the disclosure provide systems, apparatus, methods and techniques related to managing timing for self-actuated triggers when one-wire subordinate devices and two-wire subordinate devices use a common data line of a serial bus. Certain aspects of the disclosure relate to the use of locally-generated clock signal to time trigger actuation. Certain aspects of the disclosure relate to techniques for minimizing the effects of frequency mismatches between receiving devices and transmitting devices when one-wire subordinate devices and two-wire subordinate devices use a common data line of a serial bus.

In various aspects of the disclosure, a receiving device includes a clock generator circuit configured to generate a base clock signal, a counter configured to count cycles or edges of the base clock signal while a measurement pulse is received over a one-wire serial bus during a first transaction conducted over the one-wire serial bus, and a controller configured to adjust a count value of the counter when the counter is timing actuation of a trigger using a correction value that represents a difference between the cycles or edges of the base clock signal counted while the measurement pulse was being received and a number of clock cycles of a transmitter clock signal that defines a pulse duration of the measurement pulse.

In various aspects of the disclosure, a method for timing triggers in a receiving device includes generating a base clock signal, counting cycles or edges of the base clock signal using a counter of the receiving device while a measurement pulse is received over a one-wire serial bus during a first transaction conducted over the one-wire serial bus, and adjusting a count value of the counter when the counter is timing actuation of a trigger using a correction value that represents a difference between the cycles or edges of the base clock signal counted while the measurement pulse was being received and a number of clock cycles of a transmitter clock signal that defines a pulse duration of the measurement pulse.

In various aspects of the disclosure, a system includes a host device coupled to a one-wire serial bus, and a plurality of receiving devices coupled to the one-wire serial bus. Each of the plurality of receiving devices includes a clock generator circuit configured to generate a base clock signal, and a counter configured to count cycles or edges of a corresponding base clock signal. The host device is configured to initiate a first transaction to be conducted over the one-wire serial bus, transmit a broadcast command in the first transaction, transmit a measurement pulse in the first transaction and after the broadcast command, the measurement pulse having a pulse duration defined by a number of clock cycles of a transmitter clock signal used by the host device, and receive measured durations of the measurement pulse from each of the plurality of receiving devices. At least one receiving device is configured to use its counter to measure the measurement pulse by counting cycles or edges of its base clock signal while the measurement pulse is transmitted over the one-wire serial bus. The at least one receiving device is further configured to adjust a count value of its counter when the counter is timing actuation of a trigger using a correction value that represents a difference between the cycles or edges of the base clock signal counted while the measurement pulse was being received and the number of clock cycles of the transmitter clock signal used by the host device.

In certain aspects, the measurement pulse is received after an associated Manchester-encoded command is received over the one-wire serial bus. The Manchester-encoded command may be received in a datagram configured in accordance with a Radio Frequency Front-End (RFFE) protocol. The transmitter clock signal is embedded in the Manchester-encoded command.

In one aspect, the base clock signal has a frequency that is a multiple of a frequency of the transmitter clock signal.

In certain aspects, the controller in the receiving device is further configured to increase the count value of the counter when the base clock signal has a frequency that is less than a frequency of the transmitter clock signal. The controller may be further configured to decrease the count value of the counter when the base clock signal has a frequency that is greater than a frequency of the transmitter clock signal.

In certain aspects, the receiving device includes a trigger shadow register configured by trigger information received in a second transaction conducted over the one-wire serial bus. The counter may be configured with an initial count value using timing information received in the second transaction. The receiving device may be one of a plurality of receiving devices coupled to the one-wire serial bus. Each of the plurality of receiving devices may be configured by trigger and timing information received in the second transaction. Each of the plurality of receiving devices may be configured to initiate timing of actuation of a corresponding trigger when the second transaction is terminated.

In certain aspects, the controller in the receiving device is further configured to periodically adjust the count value of the counter using the correction value when the counter is timing actuation of the trigger. The controller in the receiving device may adjust the count value of the counter with a periodicity determined by a frequency of the base clock signal.

DETAILED DESCRIPTION

Figure 1:
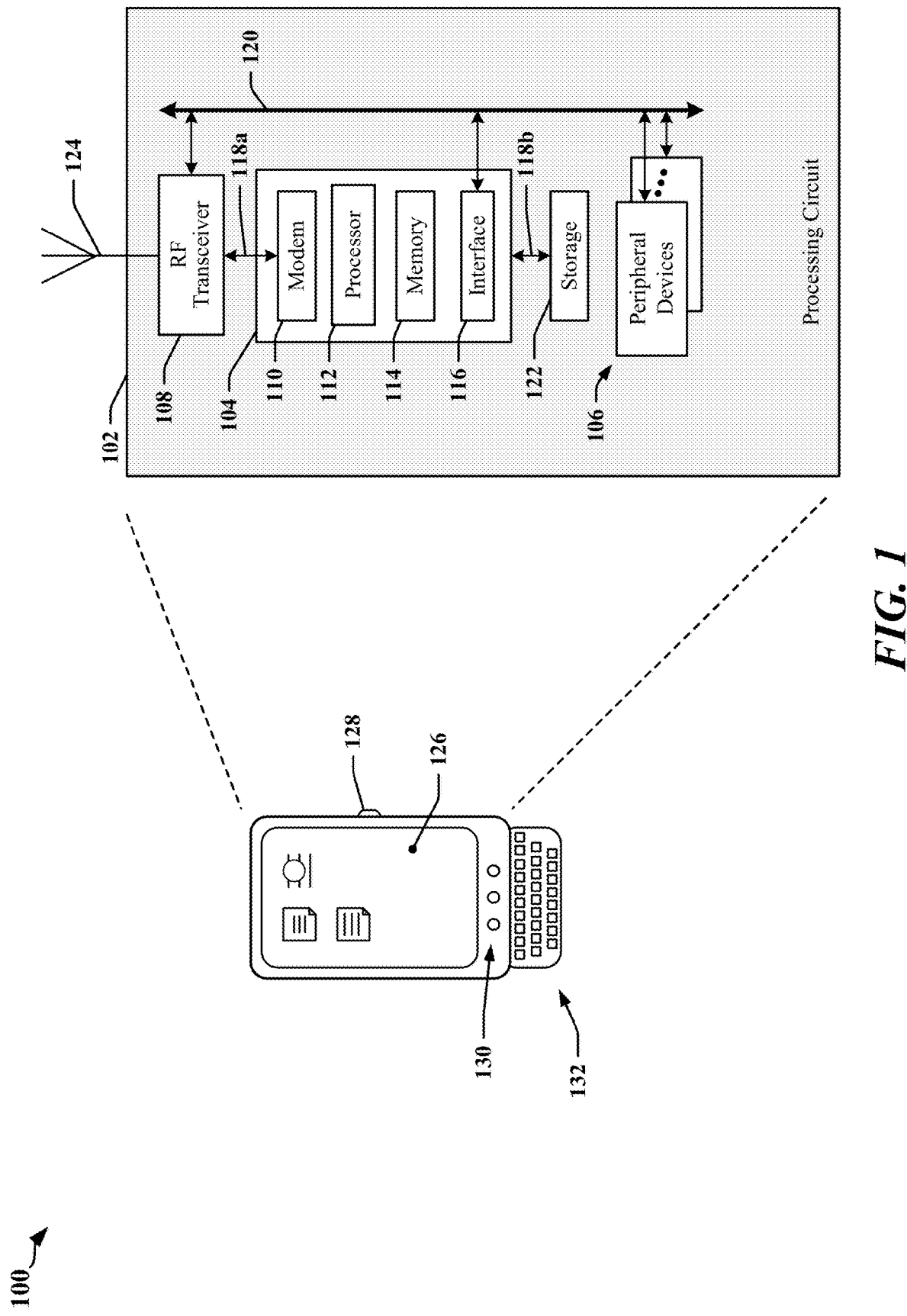
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Certain aspects of the disclosure relate to communication of digital signals that include transitions between two or more signaling states. For the purpose of this description, transitions between two signaling states in a digital signal may be referred to as edges. Transitions from a low voltage signaling state to a higher voltage signaling state may be referred to as a positive edge, a positive transition, a rising edge, a rising transition or a positive-transitioning edge. Transitions to a low voltage signaling state from a higher voltage signaling state may be referred to as a negative edge, a negative transition, a falling edge, a falling transition or a negative-transitioning edge.

Certain aspects of the disclosure relate to serial bus configurations in which multiple devices can communicate at various times. The described serial buses are typically operated in a hierarchical manner, in that one device controls communication during a transaction. The controlling device may be referred to as a host device, a bus master device, a managing device or another term favored by standards defining the protocols implemented by the controlling device. In some serial bus configurations, a single controlling device manages or controls communication during all transactions conducted over the serial bus. In other serial bus configurations, multiple devices can operate as the controlling device and one device serves as the controlling device for each transaction conducted over the serial bus. The controlling device may provide a common clock signal that is transmitted over a conventional two-wire serial bus. The controlling device may provide control signaling that identifies a type of transaction to be conducted over a conventional two-wire serial bus. During certain transactions, a controlling device may transmit commands directed to one or more receiving devices using address information provided in or with the commands. The receiving devices may be referred to as a client device, a slave device, a subordinate device, a peripheral device or another term favored by standards defining the protocols implemented by the controlling device. For the purposes of this disclosure, a controlling device will be referred to as a host device and associated receiving devices will be referred to as subordinate devices.

Devices that include multiple SoCs and/or other IC devices often employ a shared communication interface that may include a serial bus or other data communication link to connect processors with modems and other peripherals. The serial bus or other data communication link may be operated in accordance with multiple standards or protocols. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the imposition of more stringent timing constraints in support of applications, peripherals and sensors can result in greater demand on general-purpose input/output (GPIO) pin availability and communication link throughput.

Certain aspects of the disclosure relate to techniques for communication over a single wire bus, using Manchester encoding. Receive clocks generated at the receiving device and used to sample a Manchester-encoded signal can be resynchronized in every bit transmission interval, eliminating the possibility of accumulation of the effects of transmission errors on phase and frequency of the Manchester-encoded signal or on the receive clocks.

A system implemented in accordance with certain aspects of this disclosure includes a host device coupled to a one-wire serial bus and a plurality of receiving devices coupled to the one-wire serial bus. Each of the plurality of receiving devices may have a clock generator circuit configured to generate a base clock signal, and a counter configured to count cycles or edges of a corresponding base clock signal. The host device may be configured to initiate a first transaction to be conducted over the one-wire serial bus; transmit a broadcast command in the first transaction, transmit a measurement pulse in the first transaction and after the broadcast command, the measurement pulse having a pulse duration defined by a number of clock cycles of a transmitter clock signal used by the host device, and receive measured durations of the measurement pulse from each of the plurality of receiving devices. At least one receiving device may be configured to use its counter to measure the measurement pulse by counting cycles or edges of its base clock signal while the measurement pulse is transmitted over the one-wire serial bus. The at least one receiving device may be further configured to adjust a count value of its counter when the counter is timing actuation of a trigger using a correction value that represents a difference between the cycles or edges of the base clock signal counted while the measurement pulse was being received and the number of clock cycles of the transmitter clock signal used by the host device.

Certain aspects disclosed herein provide protocols that may replace or supplement a serial bus protocol, such as an I2C, I3C, SPMI, and/or RFFE protocol. Certain aspects are applicable to a serial bus operated in half-duplex mode or full-duplex mode.

Examples of Apparatus that Employ Serial Data Links

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
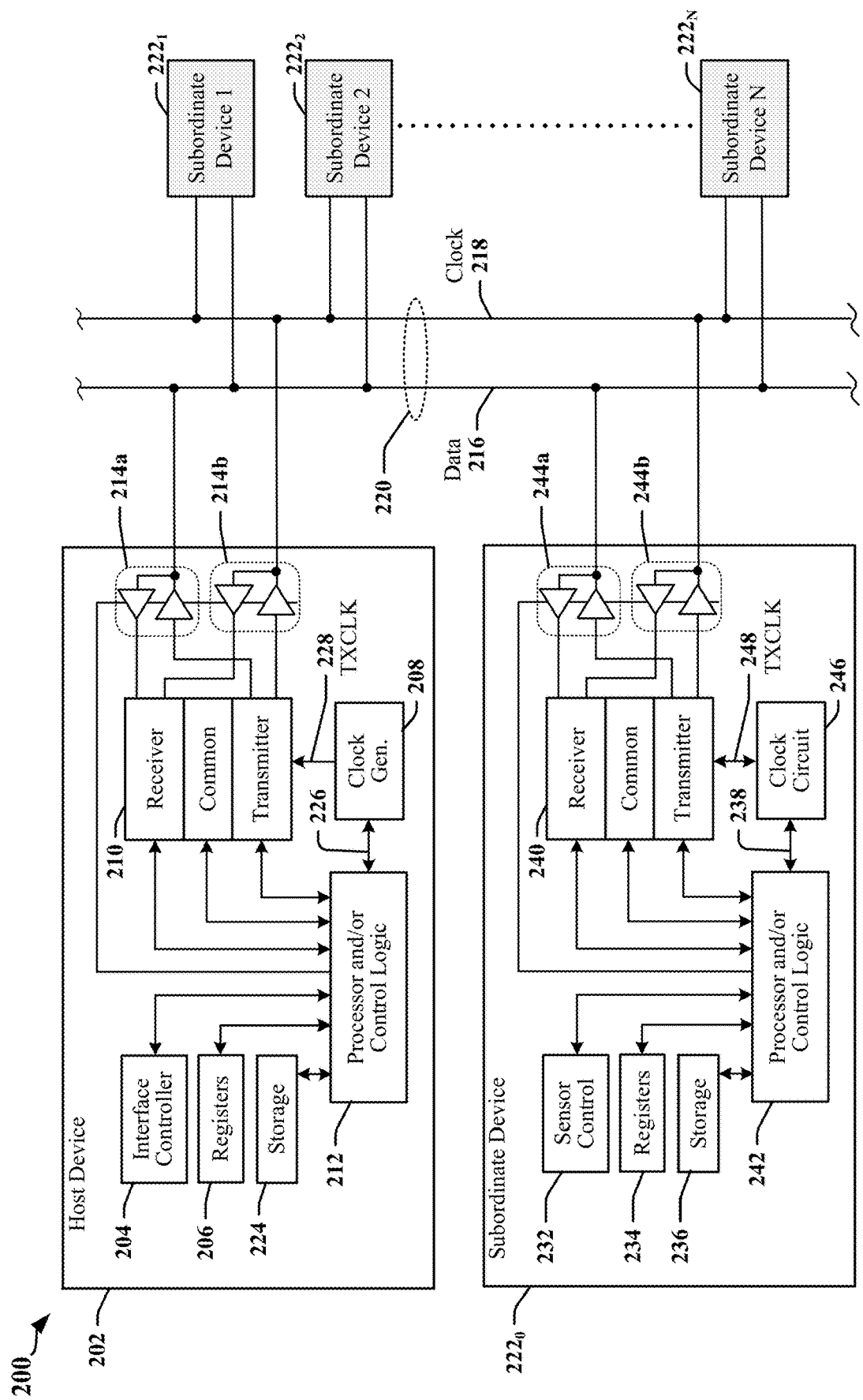
FIG. 2 illustrates a first example of an apparatus employing a data link that may be used to communicatively couple two or more devices.

FIG. 2 illustrates a first example of an apparatus 200 employing a data link that may be used to communicatively couple two or more devices. Here, the apparatus 200 includes multiple devices 202, and $222_0$-$222_N$ coupled to a two-wire serial bus 220. The devices 202 and $222_0$-$222_N$ may be implemented in one or more semiconductor IC devices, such as an application processor, SoC or ASIC. In various implementations certain of the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more devices $222_0$-$222_N$ may be used to control, manage or monitor a sensor device. Communication between devices 202 and $222_0$-$222_N$ over the serial bus 220 is controlled by a host device 202. Certain types of bus can support multiple host devices 202.

In one example, a host device 202 may include an interface controller 204 that may manage access to the serial bus, configure dynamic addresses for subordinate devices and/or generate a clock signal 228 to be transmitted on a clock line 218 of the serial bus 220. The host device 202 may include configuration registers 206 or other storage 224, and other control logic 212 configured to handle protocols and/or higher-level functions. The control logic 212 may include a processing circuit such as a state machine, sequencer, signal processor or general-purpose processor. The host device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

One or more devices $222_0$-$222_N$ may be configured to operate as a subordinate device. In some examples, a subordinate device may include circuits and modules that support a display, an image sensor, and/or circuits and modules that control and communicate with one or more sensors that measure environmental conditions. In one example, a device $222_0$ configured to operate as a subordinate device may provide a control function, module or circuit 232 that includes circuits and modules to support a display, an image sensor, and/or circuits and modules that control and communicate with one or more sensors that measure environmental conditions. In this example, the device $222_0$ can include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. In some instances, the clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one of the devices 202 and $222_0$-$222_N$ may be configured to operate as a host device and a subordinate device on the serial bus 220. Two or more of the devices 202 and $222_0$-$222_N$ may be configured to operate as a host device on the serial bus 220. The protocol selected to control operation of the serial bus 220 may define direct current (DC) characteristics affecting certain signal levels associated with the serial bus 220, and/or alternating current (AC) characteristics affecting certain timing aspects of signals transmitted on the serial bus 220. In various examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
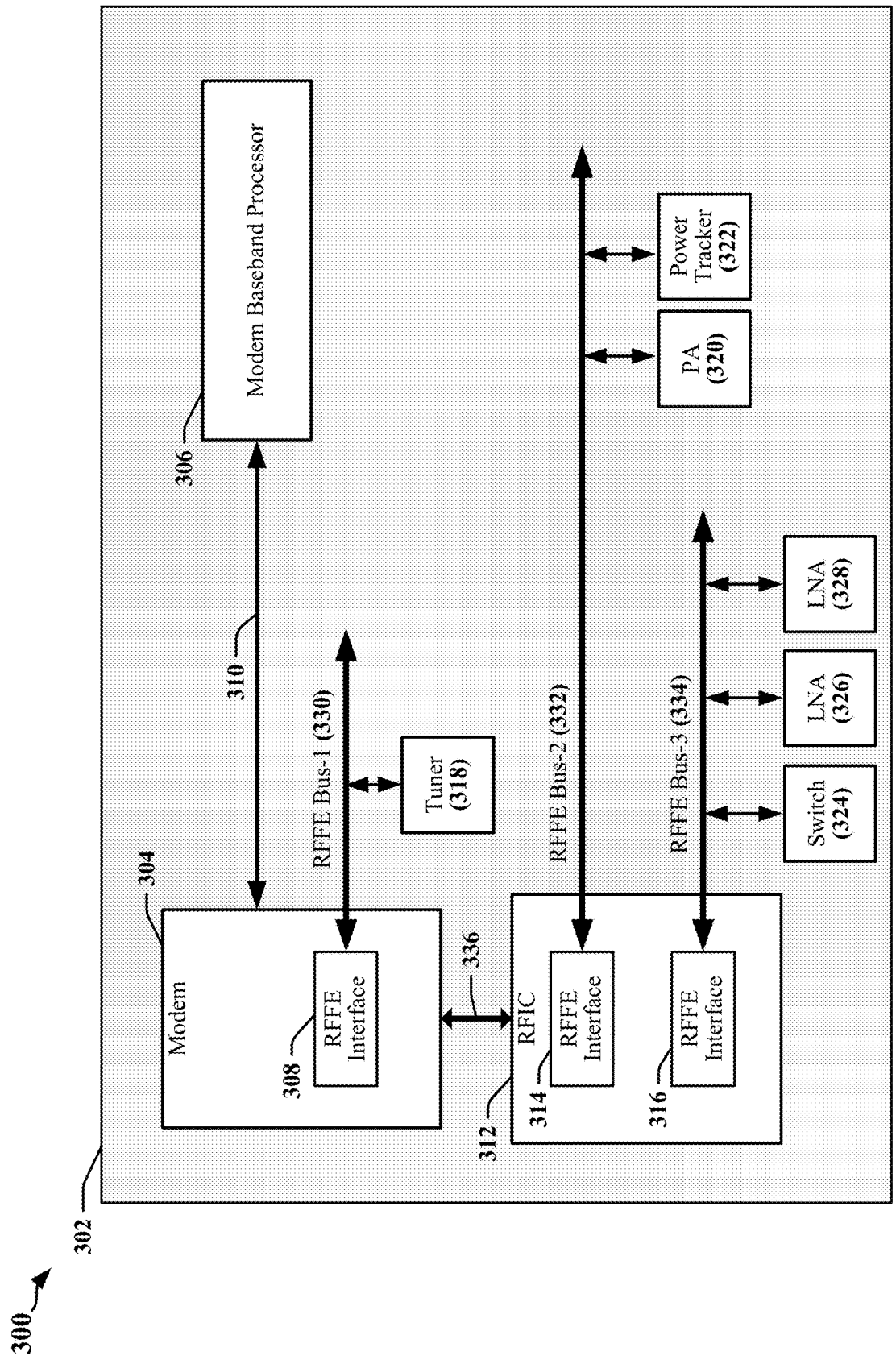
FIG. 3 illustrates a second example of an apparatus employing data links that may be used to communicatively couple two or more devices, including various radio frequency front-end devices.

FIG. 3 illustrates a second example of an apparatus 300 employing data links that may be used to communicatively couple two or more devices. In this example, a chipset or device 302 employs multiple RFFE buses 330, 332, 334 to couple various RF front-end devices 318, 320, 322, 324, 326, 328. A modem 304 includes an RFFE interface 308 that couples the modem 304 to a first RFFE bus 330. The modem 304 may communicate with a baseband processor 306 and a Radio-Frequency IC (RFIC 312) through one or more communication links 310, 336. The illustrated device 302 may be embodied in one or more of a mobile communication device, a mobile telephone, a mobile computing system, a notebook computer, a tablet computing device, a media player, a gaming device, a wearable computing and/or communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the Modem is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and a second RFFE bus 332. The RFIC 312 may communicate with a switch 324 and one or more LNAs 326, 328 through a second of its RFFE interfaces 316 and a third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized GPIO state. In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 324, LNAs 326, 328, PAs 320 and other types of device that operate concurrently in a manner that can generate inter-device interference, or that could potentially cause damage to one or more devices. Devices that may interfere with one another may exchange coexistence management (CxM) messages to permit each device to signal imminent actions that may result in interference or conflict. CxM messages may be used to manage operation of shared components including a switch 324, LNA 326, 328, PA 320 and/or an antenna.

Multi-drop interfaces such as RFFE, SPMI, I3C, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols may be employed to illustrate certain aspects disclosed herein. However, the concepts disclosed herein are applicable to other serial bus protocols and standards.

Figure 4:
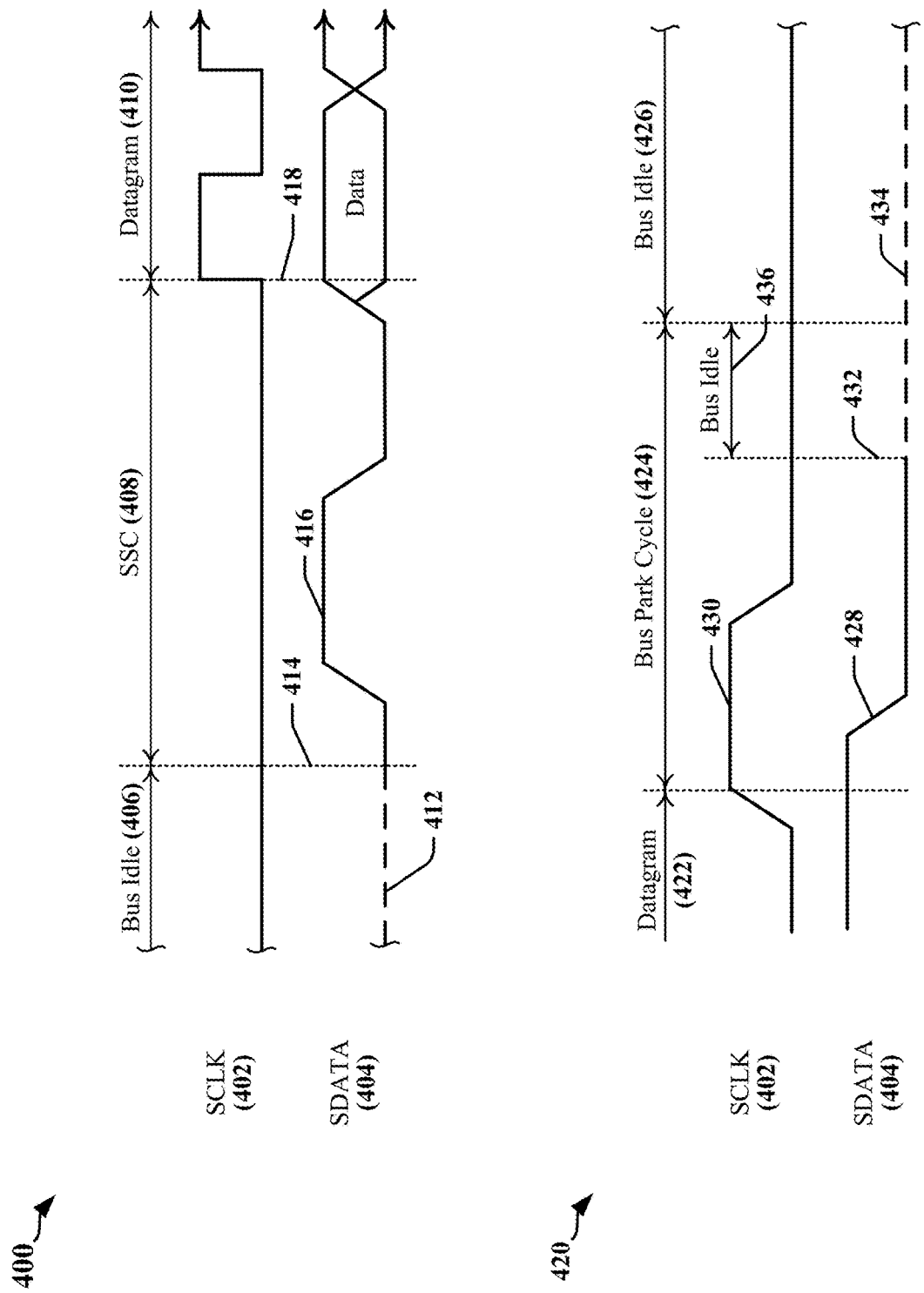
FIG. 4 includes timing diagrams that illustrate signaling transmitted to delineate the boundaries of RFFE and SPMI datagrams.

FIG. 4 includes timing diagrams 400, 420 that illustrate signaling that is transmitted to delineate the boundaries of datagrams transmitted in accordance with RFFE protocols. The timing diagrams 400, 420 show the relative timing of signals transmitted on a 2-wire serial bus that provides a clock signal on SCLK 402 and provides for exchange of data over SDATA 404. The first timing diagram 400 illustrates timing of a sequence start condition (SSC 408) that is transmitted to signal the start of a transaction such as the transmission of a datagram 410. The SSC 408 is transmitted when the serial bus is in an idle state 406. In the idle state 406, SCLK 402 is driven at full strength by a host device while subordinate devices coupled to the serial bus present a high impedance to SCLK 402. SCLK 402 is held in the low signaling state (here, at zero volts) by the host device. In the idle state 406, SDATA 404 is weakly driven by the host device or is held in the weakly driven low signaling state 412 using a keeper circuit or a weak pull-down circuit. A keeper circuit or a weak pull-down circuit may maintain the signaling state of SDATA 404, for example, when the host device has caused its line driver to enter a high impedance state and when no other device is driving SDATA 404. The weakly driven low signaling state 412 can easily be overcome by another line driver that can drive SDATA 404 at full strength.

In a master-driven SSC 408, the host device commences transmission of the SSC 408 at a first point in time 414 when it begins to drive SDATA 404 at full strength, initially at the low signaling state. The host device then provides a pulse 416 on SDATA 404 while continuing to drive SCLK 402 to the low signaling state. The pulse 416 has duration of at least one cycle of a clock signal provided on SCLK 402 during transmission of a datagram 410. At a second point in time 418, the host device commences transmission of clock pulses on SCLK 402, thereby providing the clock signal used to control or indicate timing of a datagram 410 transmitted on SDATA 404.

The second timing diagram 420 illustrates timing of a bus park cycle (the BPC 424) that may be transmitted to signal the termination of a datagram 422, for example. The BPC 424 is transmitted by providing a falling edge 428 on SDATA 404 while SCLK 402 is in a high signaling state 430. By protocol, transitions on SDATA 404 during transmission of the datagram 422 are permitted only while the clock signal is in the low signaling state, and the falling edge 428 that occurs while SCLK 402 is in the high signaling state 430 is interpreted as control signaling (i.e., the BPC 424). The falling edge 428 is provided by the host device driving SDATA 404 low at full strength. The host device then drives SCLK 402 low and continues to drive SCLK 402 at full strength through subsequent bus idle intervals 426, 436. After driving SCLK 402 low, the host device initiates a bus idle interval 436 at a time 432 when the host device causes its line driver to enter the high impedance state. While no other device is driving SDATA 404, SDATA 404 remains in the weakly driven low signaling state 434. The BPC 424 is terminated and the serial bus enters a bus idle interval 426 until the next datagram is ready for transmission.

In the various examples provided herein, the example of a 1-wire serial bus is described in which data and commands are configured in accordance with an RFFE protocol. However, the concepts are not limited to RFFE protocols and various aspects of this disclosure apply equally to I2C, I3C, SPI, SPMI and other standards-defined or proprietary protocols. The single line of the one-wire serial bus is used as a data line for bidirectional transmission of control and data signaling. According to certain aspects of this disclosure timing for communication between one-wire subordinate devices coupled to the serial bus may be embedded in data transmissions and control signaling may be provided to synchronize clock signals at the transmitter and receiver.

Figure 5:
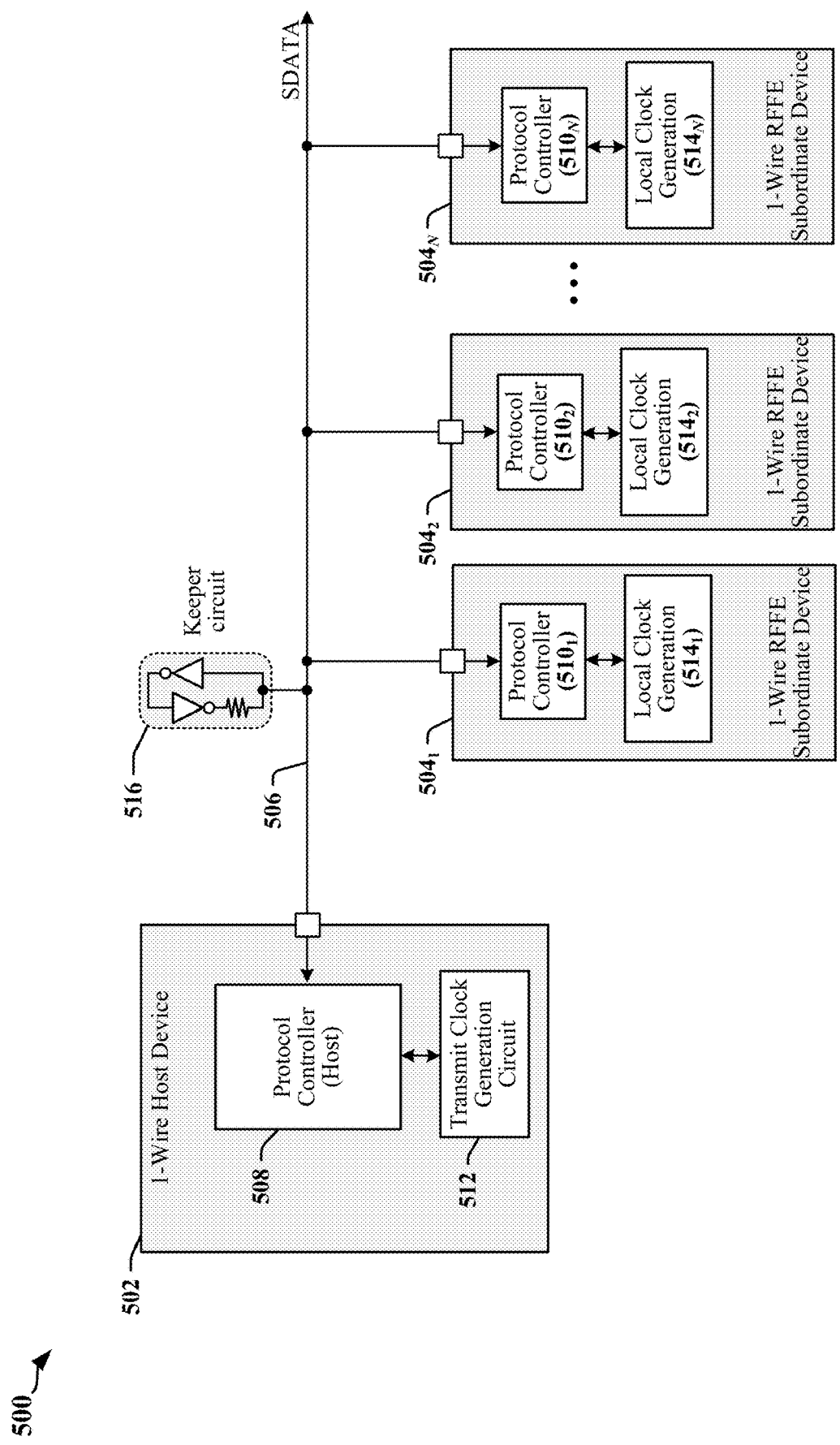
FIG. 5 illustrates a system in which a host device communicates with one or more one-wire subordinate devices in accordance with certain aspects disclosed herein.

FIG. 5 illustrates a system 500 in which a host device 502 communicates with one or more one-wire subordinate devices $504_1$-$504_N$ in accordance with certain aspects disclosed herein. The host device 502 may be provided in an RFIC, modem, application processor or another type of device. The host device 502 may be adapted to exchange data with the one-wire subordinate devices $504_1$-$504_N$ over a single wire, referred to as the SDATA line 506 in the illustrated system 500. Data is encoded in a signal transmitted over the SDATA line 506, where the signal includes embedded clock information that can be used by the receiving device to decode data from the signal.

The host device 502 and the one-wire subordinate devices $504_1$-$504_N$ typically include respective protocol controllers 508, $510_1$-$510_N$. The protocol controllers 508, $510_1$-$510_N$ may comprise a processor, controller, state machine or other logic circuits configured to support one or more protocols. The protocol controller 508 in the host device 502 may be further configured to manage communication over the SDATA line 506. In some instances, the protocol controller 508 performs some of the functions of a host device. In some implementations, the protocol controller 508 in the host device 502 may be used to configure one or more of the one-wire subordinate devices $504_1$-$504_N$. The host device 502 may determine a configuration of a one-wire subordinate device $504_1$-$504_N$ that is a designated recipient of data to be transmitted over the SDATA line 506, and may cause the protocol controller 508 to encode data intended for the recipient one-wire subordinate device $504_1$-$504_N$ in a signal to be transmitted over the SDATA line 506 and addressed to the one-wire subordinate device $504_1$-$504_N$.

The host device 502 may include a transmit clock generator 512 that can be used to define timing for transmissions over the SDATA line 506. Each of the one-wire subordinate devices $504_1$-$504_N$ includes a local clock generation circuit $514_1$-$514_N$ that provides timing for the corresponding protocol controller $510_1$-$510_N$. The local clock generation circuits $514_1$-$514_N$ may be synchronized using synchronization pulses transmitted by the host device 502 after an SSC or transmitted by the host device 502 or by one of the one-wire subordinate devices $504_1$-$504_N$ after a line turnaround. In accordance with certain aspects of this disclosure, the local clock generation circuits $514_1$-$514_N$ may be synchronized using transitions in Manchester-encoded commands and data payloads transmitted over the SDATA line 506. The local clock generation circuits $514_1$-$514_N$ may include a ring oscillator or delay locked loop. In some implementations, the local clock generation circuits $514_1$-$514_N$ may include an injection-locked oscillator that responds to synchronizing pulses and/or the transitions in Manchester-encoded command and data payload transmissions.

A keeper circuit 516 may be coupled to the SDATA line 506 to facilitate line turnaround, in-band interrupt requests or arbitration procedures in accordance with certain aspects disclosed herein. In one example, the keeper circuit 516 may be configured as a positive feedback circuit that drives the SDATA line 506 through a high impedance output, and receives feedback from the SDATA line 506 through a low impedance input. The keeper circuit 516 may be configured to maintain the last asserted signaling state or voltage on the SDATA line 506. The keeper circuit 516 can be easily overcome by an active line driver in the host device 502 or in one of the one-wire subordinate devices $504_1$-$504_N$.

Figure 6:
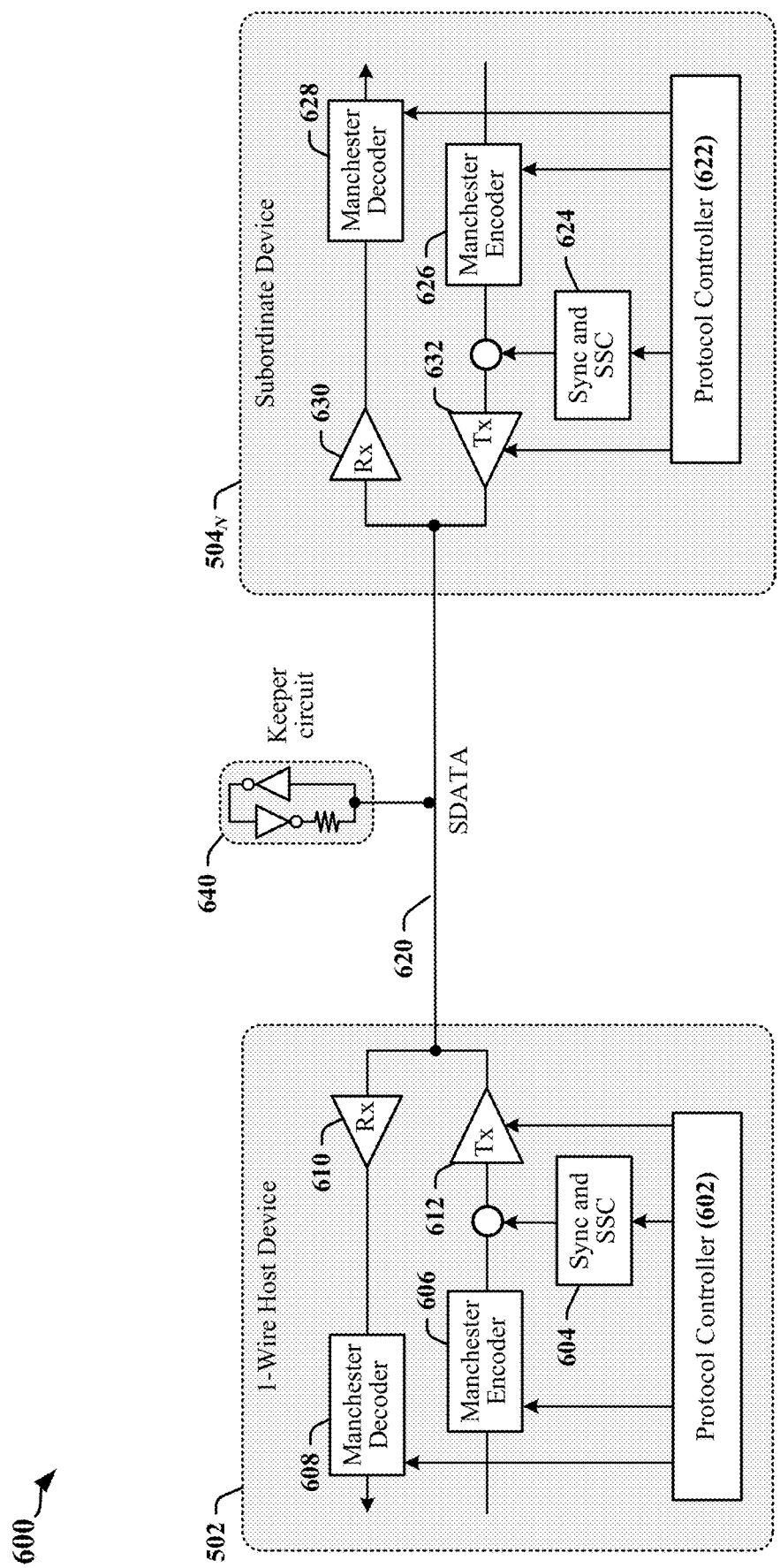
FIG. 6 illustrates an example of a 1-wire serial interface that may be configured in accordance with certain aspects of this disclosure.

FIG. 6 illustrates an example of a 1-wire serial interface 600 that may be configured in accordance with certain aspects of this disclosure. In the example, a host device 502 and one-wire subordinate device $504_N$ (see FIG. 5) are illustrated. The host device 502 includes a protocol controller 602. The protocol controller 602 may be implemented using a processor, microcontroller or finite state machine and may be used to control transmit and receive functions of the host device 502. The protocol controller 602 may include or be coupled to a signal generation circuit 604 that generates synchronization and SSC signals transmitted on the SDATA line 620 that couples the host device 502 to one or more subordinate devices $504_N$. The signal generation circuit 604 may be configured to generate different types of SSC to initiate arbitration, initiate data transfer or to abandon arbitration. The signal generation circuit 604 may be configured to generate synchronization pulses used to synchronize clock signals produced at the subordinate devices $504_N$ with a transmit clock signal generated in the host device 502.

The protocol controller 602 may be configured to selectively activate a Manchester encoder 606 and a Manchester decoder 608 based on mode of operation of the 1-wire serial interface 600. The Manchester decoder 608 may extract data and clock information from a signal received from the SDATA line 620. The protocol controller 602 may be further configured to format datagrams for transmission over the SDATA line 620. The protocol controller 602 may be further configured to generate commands to be transmitted over the SDATA line 620.

In the illustrated example, the one-wire subordinate device $504_N$ includes a protocol controller 622. The protocol controller 622 may be implemented using a processor, microcontroller or finite state machine and may be used to control transmit and receive functions of the one-wire subordinate device $504_N$. The protocol controller 622 may include or be coupled to a signal generation circuit 624 that generates synchronization pulses to be transmitted when the one-wire subordinate device $504_N$ is transmitting over the SDATA line 620. The protocol controller 622 may be further configured to cause the signal generation circuit 624 to drive the SDATA line 620 to initiate an SSC in an in-band interrupt procedure and may be further configured to cause the signal generation circuit 624 to drive the SDATA line during an arbitration procedure. The synchronization pulses generated by the signal generation circuit 604 may be configured to synchronize clock signals produced at the host device 502 with a transmit clock signal generated in the subordinate device $504_N$.

The protocol controller 622 may be configured to selectively activate a Manchester encoder 626 and a Manchester decoder 628 based on mode of operation of the 1-wire serial interface 600. The Manchester decoder 628 may extract data and clock information from a signal received from the SDATA line 620. The protocol controller 622 may be further configured to format datagrams for transmission over the SDATA line 620. The protocol controller 622 may be further configured to disassemble datagrams and/or respond to commands received from the SDATA line 620.

The protocol controller 602 may be configured to manage and control the operation of a line driver 612 and a line receiver 610. The protocol controller 622 may be configured to manage and control the operation of a line driver 632 and a line receiver 630. The line drivers 612, 632 may present a high impedance to the SDATA line 620 when inactivated or disabled. For example, the output of the line driver 612 in the host device 502 may present a high impedance to the SDATA line 620 when the one-wire subordinate device $504_N$ is configured or expected to transmit data or control signals over the SDATA line 620. The output of the line driver 632 in the one-wire subordinate device $504_N$ is typically in the high impedance state when the host device 502 is driving the SDATA line 620.

A keeper circuit 640 coupled to the SDATA line 620 facilitates line turnaround, in-band interrupt requests and arbitration procedures in a bidirectional 1-wire serial bus. It is often desired to maintain the state of the SDATA line 620 when all devices are in high impedance mode, during line turnarounds or in arbitration procedures. Line turnaround occurs when the host device 502 transitions from transmitting to receiving or from receiving to transmitting. During arbitration procedures, the host device 502 may enter high impedance mode when the one-wire subordinate device $504_N$ has the option to transmit and the line driver in the host device 502 may present a high impedance to the SDATA line 620 to avoid contention. The state of the SDATA line 620 may be maintained using the keeper circuit 640. In one example, the keeper circuit 640 may be configured as a positive feedback circuit that drives the SDATA line 620 through a high impedance output, and receives feedback from the SDATA line 620 through a low impedance input. The keeper circuit 640 may be configured to maintain the last asserted voltage on the SDATA line 620. The keeper circuit 640 can be easily overcome by the line drivers 612, 632 in the host device 502 and the one-wire subordinate device $504_N$, respectively.

In accordance with certain aspects disclosed herein, one or more protocols may be used for controlling operation of a mixed mode serial bus that is coupled to concurrently active 2-wire subordinate devices and 1-wire subordinate devices. The protocols used to configure manage and control one-wire transmissions over the serial bus as disclosed herein may coexist with, be based on and/or be compatible with the protocols used to configure manage and control two-wire transmissions over the serial bus.

Figure 7:
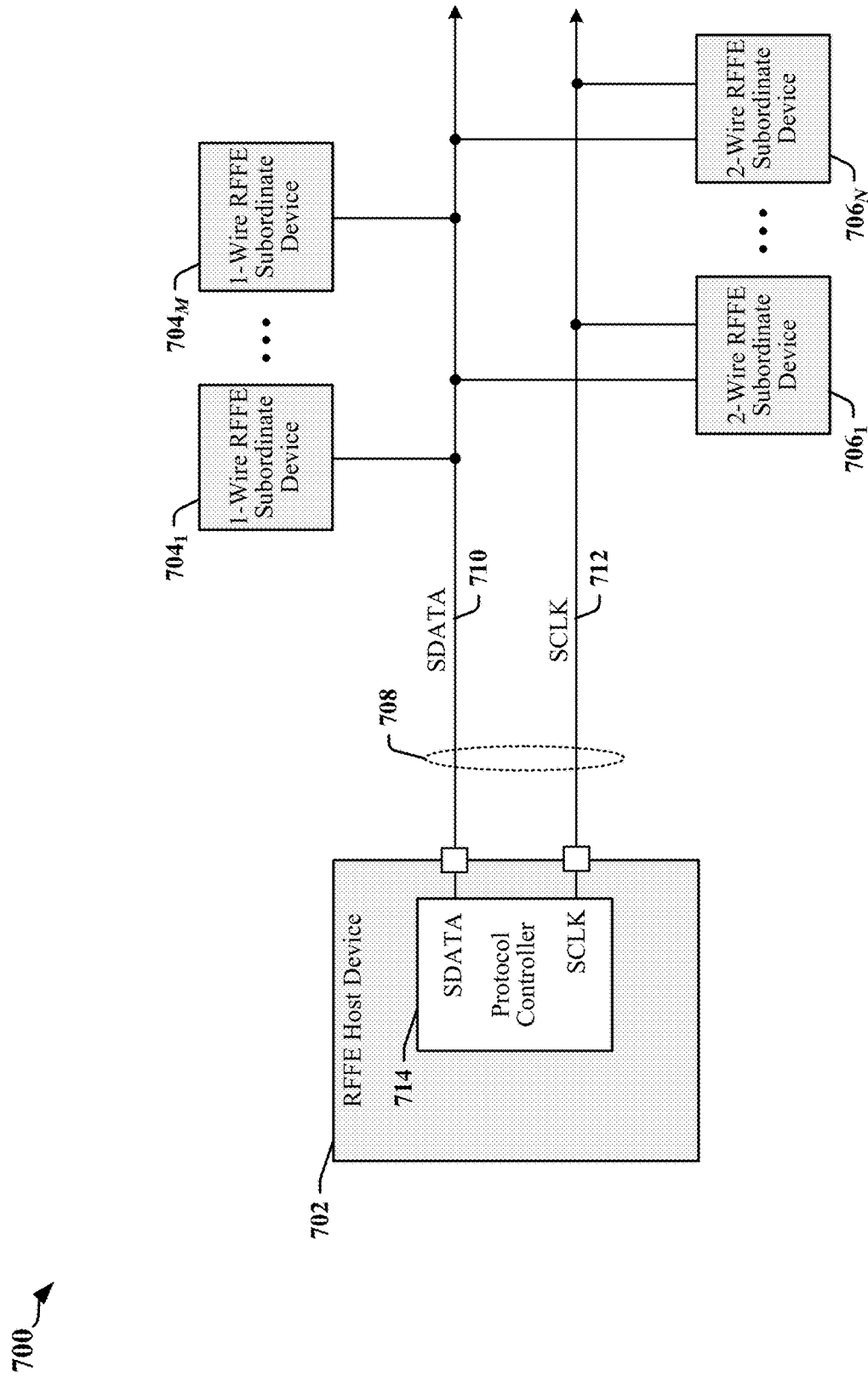
FIG. 7 illustrates a system in which one-wire subordinate devices and two-wire subordinate devices coexist in accordance with certain aspects disclosed herein.

FIG. 7 illustrates a system 700 in which one-wire subordinate devices $704_1$-$704_M$ and two-wire subordinate devices $706_1$-$706_N$ can coexist, and where a host device 702 can communicate with both the one-wire subordinate devices $704_1$-$704_M$ and the two-wire subordinate devices $706_1$-$706_N$ in accordance with certain aspects disclosed herein. The host device 702 may be provided in an RFIC, modem, application processor or another type of device. The host device 702 is coupled to one or more subordinate devices $704_1$-$704_M$, $706_1$-$706_N$ through at least the SDATA line 710 of a two-wire serial bus 708 that also has an SCLK line 712. Data can be encoded in a data signal transmitted over the SDATA line 710 and, in a two-wire mode of communication, a receiver can extract the data using a clock signal transmitted over the SCLK line 712. In the illustrated example, the serial bus 708 is operated in accordance with an RFFE protocol. In other examples, the serial bus 708 may be operated in accordance with another protocol, such as an I3C protocol, SPMI protocol or the like. In the illustrated example, each one-wire subordinate device $704_1$-$704_M$ and each two-wire subordinate device $706_1$-$706_N$ is coupled to the SDATA line 710. The one-wire subordinate devices $704_1$-$704_M$ are adapted for a one-wire mode of communication, while the two-wire subordinate devices $706_1$-$706_N$ are also coupled to the SCLK line 712 to receive the clock signal used in the two-wire mode of communication.

The host device 702 may include a protocol controller 714, which may be implemented using a processing circuit having a processor, controller, state machine or other logic. The protocol controller 714 may be configured to support one or more protocols that can be used to manage operation of the serial bus 708. In some implementations, the protocol controller 714 may be operable to configure one or more subordinate devices $704_1$-$704_M$, $706_1$-$706_N$. The protocol controller 714 may determine a configuration of a subordinate device $704_1$-$704_M$, $706_1$-$706_N$ that is a designated recipient of data to be transmitted over the serial bus 708, and may encode data in a signal to be transmitted over the SDATA line 710 accordingly. In some instances, a broadcast message directed to a combination of one-wire subordinate devices $704_1$-$704_M$ and two-wire subordinate devices $706_1$-$706_N$ may be sent twice, once in the one-wire mode of communication and once in the two-wire mode of communication. The protocol controller 714 may additionally determine whether and/or when a clock signal is to be transmitted over the SCLK line 712. In some implementations, the clock signal is suppressed when data is transmitted in the one-wire mode of communication to one or more one-wire subordinate devices $704_1$-$704_M$.

According to certain aspects disclosed herein, the host device 702 may select between one-wire subordinate devices $704_1$-$704_M$ and two-wire subordinate devices $706_1$-$706_N$ when commencing a transaction. The host device 702 may use different sequence start conditions (SSCs) to precede one-wire and two-wire transactions. In some implementations, certain interface characteristics of the one-wire subordinate devices $704_1$-$704_M$ and/or two-wire subordinate devices $706_1$-$706_N$ may be configurable. For example, a one-wire subordinate device $704_1$-$704_M$ and/or a two-wire subordinate device $706_1$-$706_N$ coupled to the serial bus 708 may match a specified bus capacitance when driving the SDATA line 710 based on a configurable register setting that defines the capacitance specified for the SDATA line 710. In other instances, the specified bus capacitance can be hardwired in the one-wire subordinate devices $704_1$-$704_M$ and/or two-wire subordinate devices $706_1$-$706_N$.

In certain implementations, a programmable sequence of synchronization pulses transmitted after the SSC or other start of frame signaling can be used at the receiver as edge sensitive phase synchronization triggers. In one example, the synchronization pulses are transmitted before transmission of data bits, including after line turnaround events when a receiving device becomes a transmitting device. In other implementations, first-transmitted synchronization pulses can serve as start of frame signaling. In some implementations, each synchronization pulse is transmitted in a single clock cycle.

State transitions of the interface may be detected and used to disable or enable an oscillator in the receive clock generation circuit. For example, the oscillator may be enabled upon detection of the SSC or other start of frame signaling and may be disabled upon detection of a BPC or other end of frame signaling, thereby conserving energy by avoiding the need for an always-on, free-running oscillator. When the 1-wire serial bus is controlled by a protocol that is derived from RFFE protocols, an SSC indicates the start of frame.

Triggers provide a mechanism for RF front-end control and may be used to coordinate activities of different front-end components. For example, triggers can be used for a variety of purposes including beam steering or beamforming, gain setting, antenna path multiplexer control, etc. In some devices, triggers can be configured, activated and/or actuated over a serial bus operated in accordance with RFFE protocols. In some conventional systems, a Bus Owner Master (BoM) may transmit a command that includes a trigger configuration and an action associated with the configured trigger, such that receipt of the command causes the trigger to be actuated or otherwise take effect or be applied. A trigger configured by the command may be referred to as a self-actuating trigger.

Advances in RF technology and the introduction of increased capabilities in communication devices increase pressure on latency times. For example, the deployment of radio access technologies such as the 5G New Radio technology defined by the 3rd Generation Partnership Project (3GPP) and the 802.11ax WLAN standard defined by the Institute of Electrical and Electronics Engineers (IEEE) 802.11 Working Group can require a 50% reduction in latency at conventional bus clock frequencies, increase complexity of RFFE bus architectures and increase the potential for traffic congestion on the bus. RFFE bus congestion and timing bottlenecks may be expected to exacerbate coexistence issues. For example, increased bus activity may increase bus contention issues where RFFE bus timing is complicated. In these scenarios, a BoM may be prevented from sending the triggers at an exact time needed by slave devices to meet the RF protocol timing.

In some systems, delayed triggers may be used to avoid bus congestion and timing bottlenecks and ensure timely actuation of triggers. A BoM may configure one or more triggers and corresponding timers that control the actual timing of the configured triggers. For example, the BoM may define an action associated with the configured triggers and may activate one or more counters or timers that define a time at which triggers may be actuated. Actuating a trigger causes or initiates the action associated with the trigger. The counter or timer may define the time of actuation as a number of clock cycles in the clock signal transmitted by the BoM to control timing on the serial bus.

Figure 8:
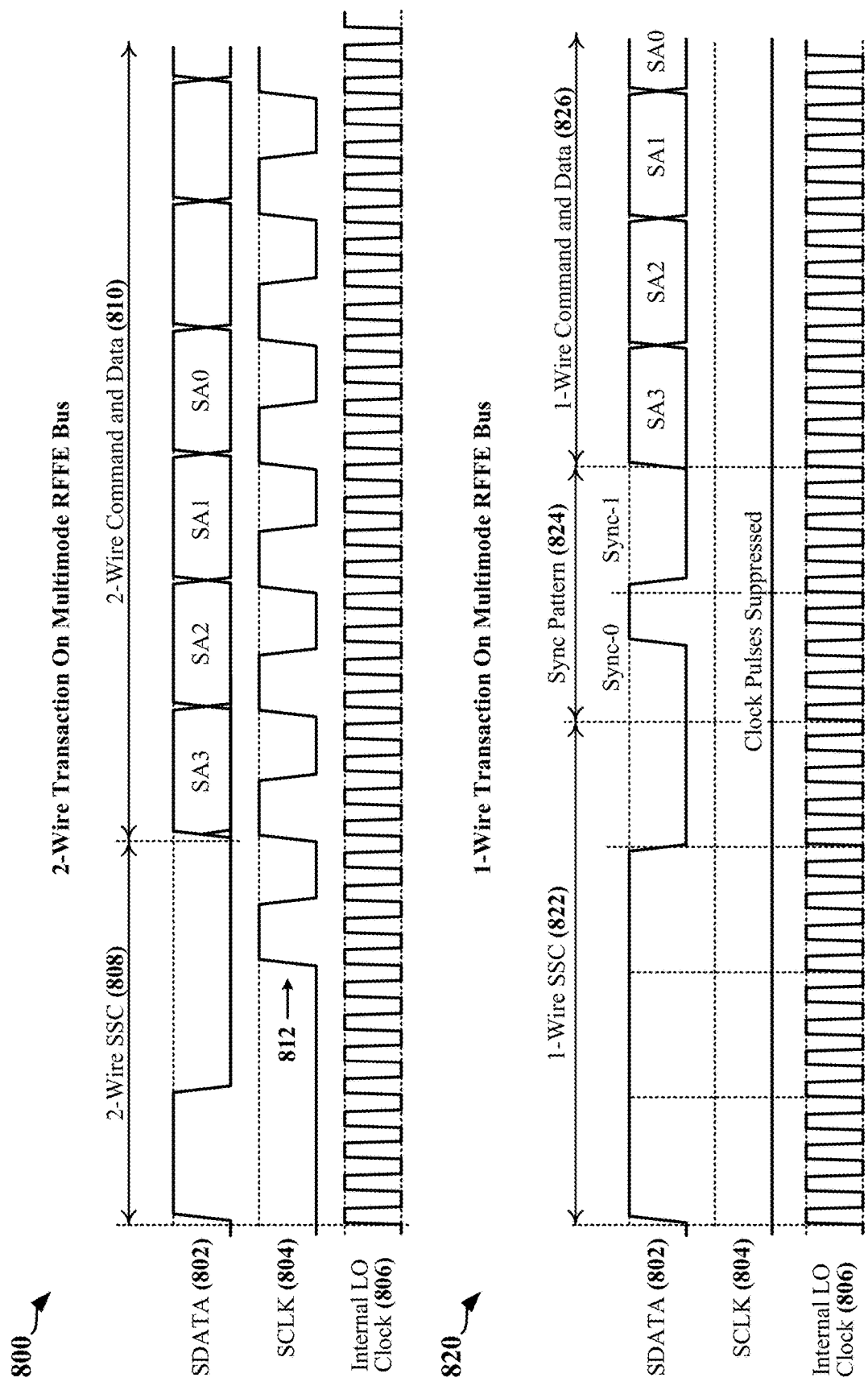
FIG. 8 illustrates certain features of a 1-wire transaction in accordance with certain aspects of this disclosure.

FIG. 8 illustrates the start of a 2-wire transaction 800 and the start of a 1-wire transaction 820 that may be transmitted over the serial bus 708 illustrated in FIG. 7 in accordance with certain aspects of this disclosure. The 2-wire transaction 800 and 1-wire transaction 820 may be formatted in accordance with RFFE protocols.

The 2-wire transaction 800 commences with an SSC 808 that has a duration consistent with RFFE protocols. The serial bus 708 is initially in an idle state, where both the SDATA line 802 and the SCLK line 804 are in a low signaling state. A host device 702 may initiate the 2-wire transaction 800 by transmitting a two-bit SSC 808. Bit-time, or the transmission time of each data bit, may be determined by the frequency of an internal clock signal used by the host device 702. The internal clock may be selected to control bitrate of the serial bus 708 during data transmission. The SSC 808 includes a pulse transmitted on the SDATA line 802 while the SCLK line 804 remains low. The pulse includes a one-bit high portion and is followed by a one-bit low portion. The SSC 808 may be followed by a subordinate address that may part of command and data information 810. In conventional RFFE operation, the command and data information 810, which includes a subordinate address [SA3:SA0]. Information may be captured from the SDATA line 802 based on timing of clock pulses in the transmit clock signal 812 that is provided on the SCLK line 804. No clock pulse is provided during transmission of the SSC 808, and a receiving device recognizes that the transitions in signaling state on the SDATA line 802 indicate control signaling when the SCLK line 804 remains low.

Various aspects of the SSC 808 are defined by RFFE protocols, including the durations of the high portion of the SSC 808 and the low portion of the SSC 808. The rise time ($T_R$) of the leading transition and the fall time ($T_F$) of the pulse-terminating transition are also defined by protocol. Limits on the frequency of the clock signal transmitted on the SCLK line 804 may be defined by design, application, and/or by RFFE specifications and protocols. A protocol controller 714 may be configured to transmit a modified SSC that indicates when a transaction is to be conducted with a one-wire subordinate device $704_1$-$704_M$. In certain examples, the protocol controller 714 may transmit an extended-length SSC to target a one-wire subordinate device $704_1$-$704_M$ for communication and/or to indicate that the transaction is to be conducted in a one-wire mode of communication. The extended-length SSC may have a duration that is greater than the duration of an SSC pulse defined by RFFE specifications for 2-wire operation. In some implementations, the protocol controller 714 may transmit a shortened SSC to target a one-wire subordinate device $704_1$-$704_M$ for communication, where the shortened SSC includes a pulse with a duration that is less than the duration of an SSC pulse provided in accordance with RFFE specifications. In some instances, the protocol controller 714 may transmit an SSC with modified rise time and/or fall time to target a one-wire subordinate device $704_1$-$704_M$ for communication.

The illustrated 1-wire transaction 820 provides one example of the use of an extended-duration SSC 822 that is configured to target one-wire subordinate devices $704_1$-$704_M$. The serial bus 708 is initially in an idle state, where both the SDATA line 802 and the SCLK line 804 are in a low signaling state. The 1-wire nature of the transaction 820 is indicated by a pulse timing signature in the SSC 822. In the illustrated example, the pulse timing signature corresponds to a pulse duration of the SSC 822, which is three times greater than the pulse duration of the SSC 808 transmitted to initiate the 2-wire transaction 800. In other examples, the pulse duration of the SSC 822 may be some other multiple of the pulse duration of the SSC 808 that is transmitted to initiate the 2-wire transaction 800.

The duration of the pulses in the SSC 808 and 828 can be measured or determined using an internal clock signal 806 provided in one-wire subordinate devices $704_1$-$704_M$ and two-wire subordinate devices $706_1$-$706_N$. The illustrated internal clock signal 806 is an oversampling signal, which has a frequency that is four times greater than the frequency of the transmit clock signal 812 transmitted on the SCLK line 804 during 2-wire transactions 800. In one example, the frequency of the transmit clock signal 812 is 52 MHz. The internal clock signal 806 is needed to measure the duration of the pulses in the SSC 808 and 828 because no clock pulses are provided on the SCLK line 804 during transmission of the SSC 808 or 828.

A host device 702 may initiate the 1-wire transaction 820 by transmitting the extended-duration SSC 822. The pulse in the extended-duration SSC 822 includes a three-bit high portion followed by a one-bit low portion. The extended-duration SSC 822 is followed by a synchronization pattern 824 comprising bits that can be used to synchronize the phase of the internal clock signal 806 with edges in the data signal transmitted over the SDATA line 802. Command and data information 826 is transmitted by the host device 702 in a Manchester-encoded data signal after the synchronization pattern 824 has been transmitted. Command and payload data in a 1-wire transaction 820 may be sampled or captured based on timing of the synchronized internal clock signal 806.

In accordance with certain aspects of this disclosure, a subordinate 1-wire device can overcome the lack of a reference clock for trigger timing when coupled to a serial bus that is used for two-wire communication while the subordinate 1-wire device is timing trigger actuation.

Figure 9:
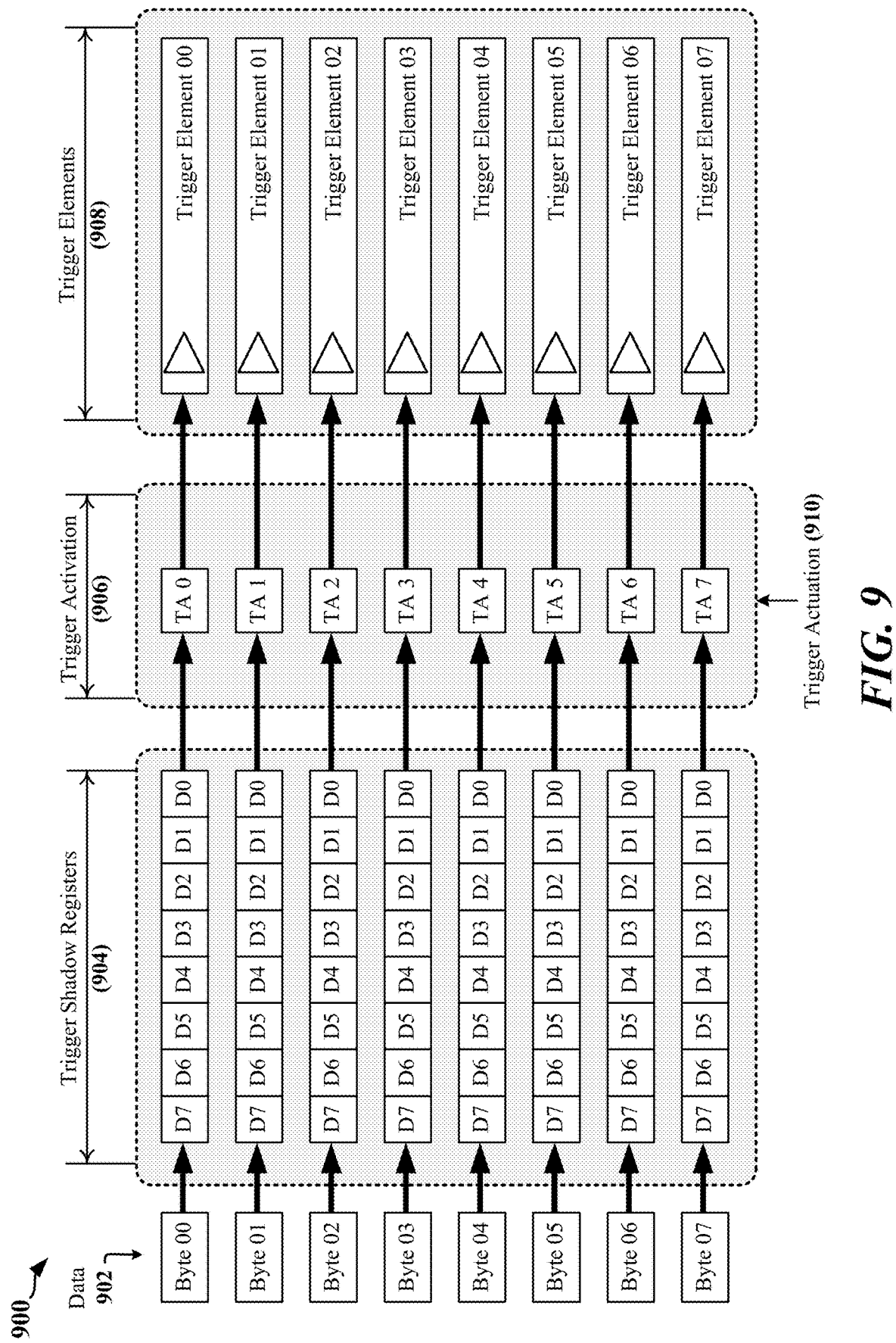
FIG. 9 illustrates actuation of triggers in accordance with certain aspects disclosed herein.

FIG. 9 is a block diagram illustrating an example of a trigger actuation circuit 900 that may be configured to configure, activate and actuate triggers. In the illustrated example, configuration information is received as a plurality of data bytes 902, which may be stored in trigger shadow registers 904. The trigger shadow registers 904 may be written in a configuration transaction conducted over a serial bus, which may be operated in accordance with an RFFE protocol. The contents of the trigger shadow registers 904 may be forwarded to a target for configuration using a timer or counter in a controlling circuit that is configured based on information provided by the BoM, for example.

Trigger activation logic 906 may be configured to enable the contents of the trigger shadow registers 904 to be transferred to respective target devices in response to a trigger command or trigger actuation signal 910 received provided by the controlling circuit. The trigger elements 908 may include switches 324, LNAs 326, 328, PAs 320 and other types of device that operate concurrently in an RF front-end. In one example, a BoM may configure a mask or gating logic that determines which trigger elements 908 are to receive data from the trigger shadow registers 904 during actuation initiated by the trigger actuation signal 910. In another example, the mask or gating logic may determine the trigger elements 908 that are to receive data from the trigger shadow registers 904 during actuation initiated by corresponding trigger actuation signals 910.

Certain aspects disclosed herein provide mechanisms that enable a BoM to configure triggers with reliable delayed actuation in 2-wire subordinate devices and 1-wire subordinate devices coupled to a mixed mode serial bus. The triggers can be configured before the time defined for actuation, and a slave device may wait for a defined period of time before actuating the trigger. In one example, the BoM can send triggers ahead of time and when bus traffic conditions allow. A slave device may include configurable counters or timers that provide trigger actuation signals 910 based on timing provided by a clock information transmitted over the serial bus by the BoM. The clock information may be sent over a dedicated clock line to a 2-wire subordinate device. The clock information may be provided to a 1-wire subordinate device as equivalent clock ticks that are encoded by continuously transmitting data or commands over the wire of the serial bus that is coupled to 1-wire subordinate devices, thereby enabling the 1-wire subordinate devices to maintain a synchronized local clock that can be used to time trigger actuation.

Figure 10:
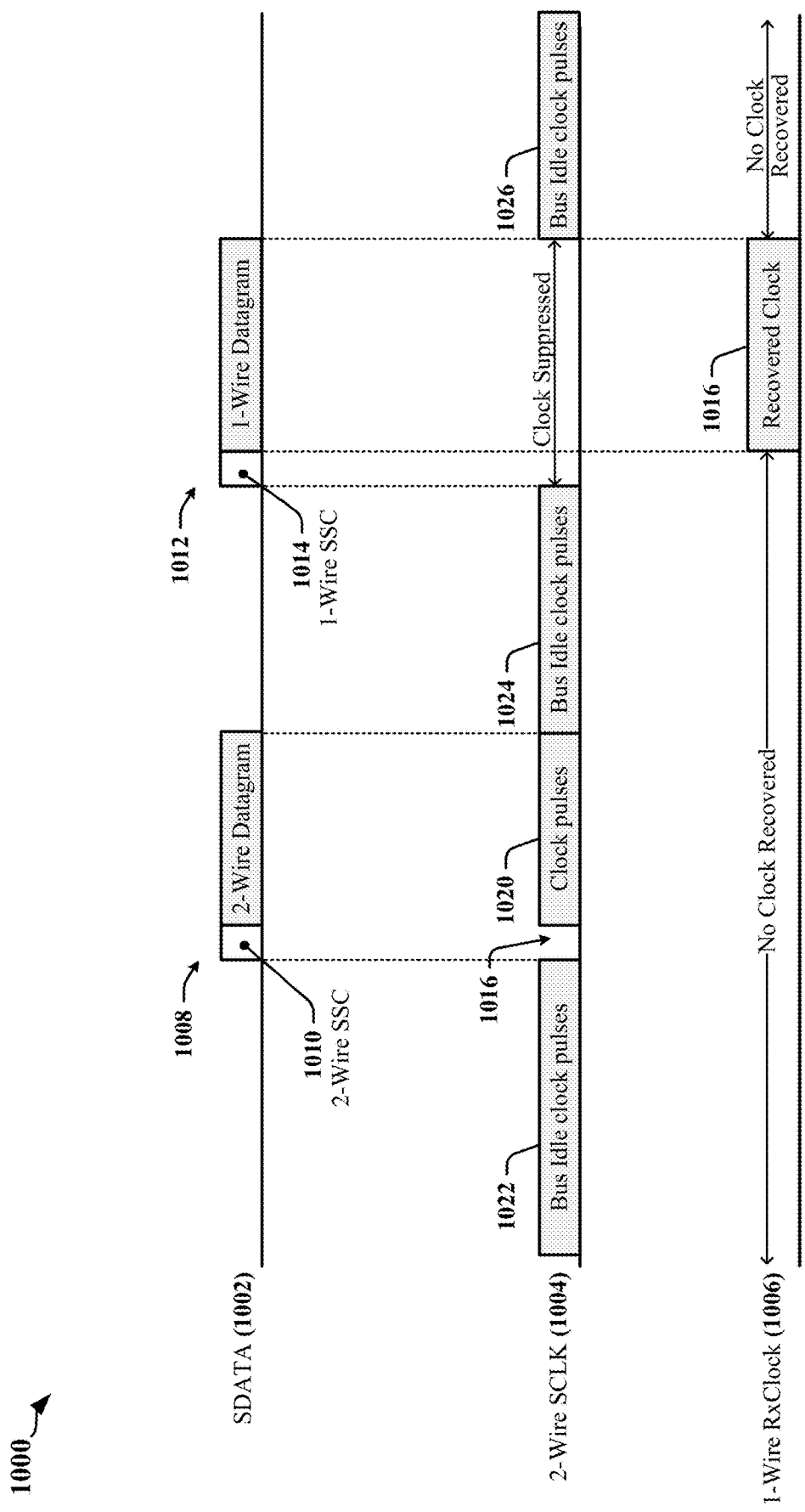
FIG. 10 illustrates the availability of timing information for subordinate devices coupled to a mixed mode serial bus when both 1-wire and 2-wire subordinate devices are actively communicating over the mixed mode serial bus.

FIG. 10 is a timing diagram 1000 that illustrates the availability of timing information for subordinate devices coupled to a mixed mode serial bus when both 1-wire and 2-wire subordinate devices are actively communicating over the mixed mode serial bus. The 1-wire and 2-wire subordinate devices are coupled to a common data line (SDATA 1002). The 2-wire subordinate devices are coupled to a dedicated clock line (SCLK 1004) which provides timing information (clock pulses 1020) used to transmit and receive data and commands over SDATA 1002 during 2-wire transactions 1008. The 1-wire subordinate devices generate an internal clock signal, which may be referred to as a local oscillator (LO) clock signal and which can be used to generate a receive clock signal (the 1-Wire RxClock 1006) that is synchronized to transitions in a Manchester-encoded signal transmitted over SDATA 1002 during 1-wire transactions 1012.

A BoM may configure a counter or other timing device in 1-wire and/or 2-wire subordinate devices to actuate triggers at corresponding desired points in time. In nominally operating system, the triggers may be configured to be actuated at the same point in time or in a closely-timed sequence.

In one example, a nominally-operating system may support only 2-wire subordinate devices in which trigger timing can be derived from the clock signal transmitted over SCLK 1004. The BoM transmits clock pulses while a datagram is transmitted in a 2-wire transaction 1008. For the purposes of trigger timing over a serial bus restricted to 2-wire usage, the BoM may transmit clock pulses 1022, 1024, 1026 when SDATA 1002 is idle. A 2-wire subordinate device can add clock pulses for idle periods 1016 of SCLK 1004 that correspond to the transmission of the 2-wire SSC 1010.

Other systems include 1-wire subordinate devices and 2-wire subordinate devices that are coupled to a mixed mode serial bus. The clock signal transmitted over SCLK 1004 may be suppressed when a 1-wire transaction 1012 is executed over a mixed mode serial bus. The SCLK 1004 is suppressed to prevent 2-wire subordinate devices from recognizing or responding to 1-wire SSCs 1014 and 1-wire signaling that might resemble an SSC. A 2-wire subordinate device coupled to a mixed mode serial bus generally cannot know the number of clock pulses missed when the clock signal is suppressed during a 1-wire transaction 1012.

In another example, a nominally-operating system may comprise a system that supports only 1-wire subordinate devices in which trigger timing can be derived from the 1-Wire RxClock 1006. A 1-wire subordinate device can generate the 1-Wire RxClock 1006 while a datagram is transmitted in a 1-wire transaction 1012. For the purposes of trigger timing over a serial bus restricted to 1-wire usage, the BoM may transmit a stream of null or unaddressed data when SDATA 1002 is idle. The 1-wire subordinate device can add or interpolate clock pulses for periods that correspond to the transmission of the 1-wire SSC 1014. The 1-wire subordinate device cannot synchronize its 1-Wire RxClock 1006 when a 2-wire transaction 1008 is executed over a mixed mode serial bus. The accuracy of trigger timing can deteriorate significantly with the loss of clock information that occurs when Manchester-encoded data is not transmitted by the BoM.

A subordinate device configured in accordance with certain aspects of this disclosure can provide improved trigger timing accuracy by calibrating subordinate devices using timing information related to one or more internal clock signals. A 1-wire subordinate device configured in accordance with certain aspects of this disclosure may use an internal base clock signal to generate a receive clock signal that is synchronized to the BoM transmitter clock signal used to encode a Manchester-encoded signal transmitted over SDATA 1002. In some implementations, the base clock signal is generated by a local oscillator and has a frequency that is four times the frequency of the BoM transmitter clock signal, and can provide the resolution necessary to calibrate the receive clock signal or compensate for differences in frequency observed between the receive clock signal and the BoM transmitter clock signal. Certain aspects of this disclosure apply also to 2-wire subordinate devices, including 2-wire subordinate devices that use or can generate base clock signals at a frequency that is a multiple of the frequency of the BoM transmitter clock signal. In some instances, a BoM coupled to mixed mode serial bus may configure self-actuating triggers for any or all 1-wire subordinate devices coupled to the mixed mode serial bus before configuring corresponding self-actuating triggers for 2-wire subordinate devices coupled to the mixed mode serial bus. In these instances, the BoM may refrain from 1-wire communication and until all triggers have been actuated, and can transmit a clock signal for the use of 2-wire subordinate devices while the mixed mode serial bus is idle.

Figure 11:
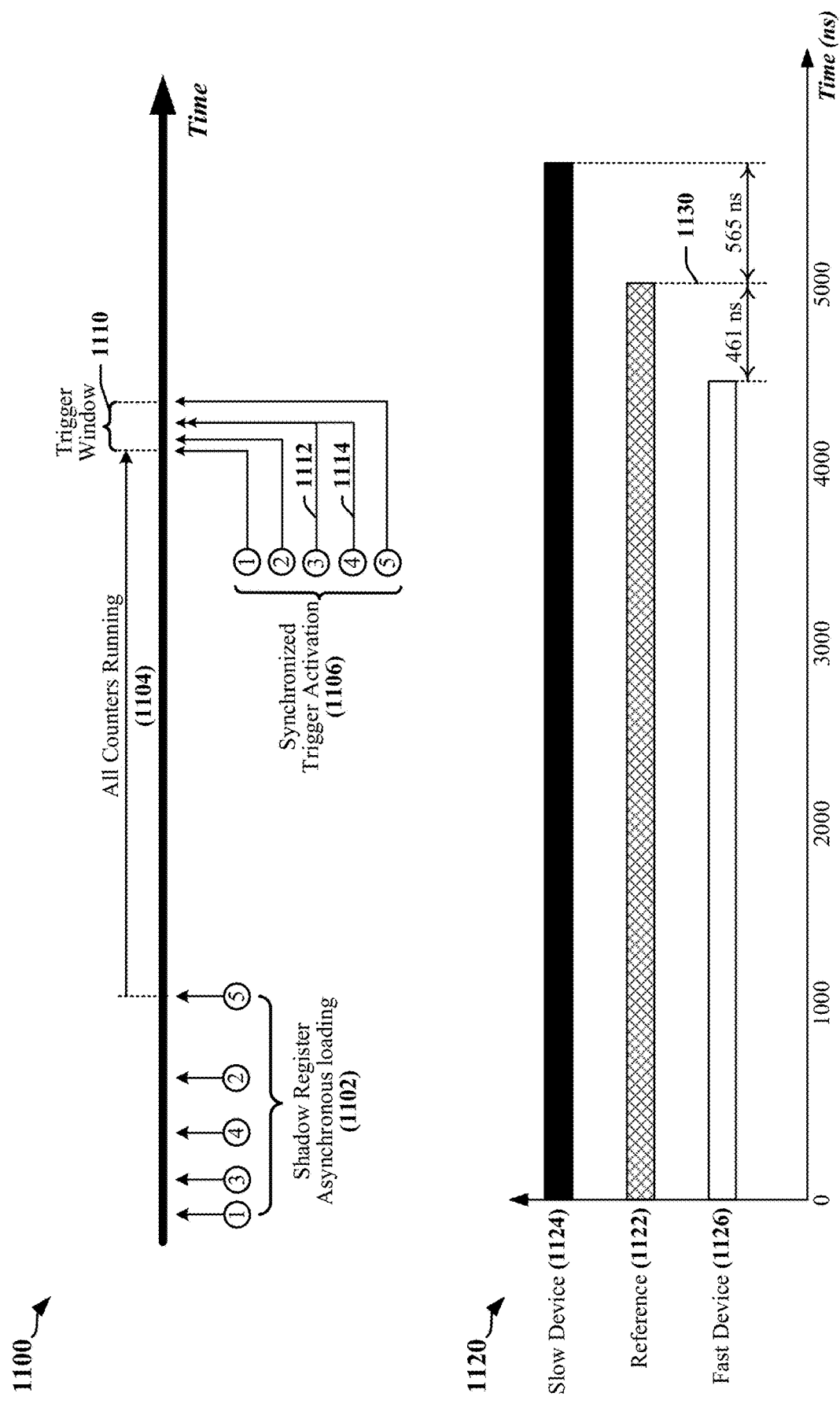
FIG. 11 illustrates certain aspects of timing in subordinate devices configured to manage the timing of self-actuated triggers using internal clock resources.

FIG. 11 illustrates certain aspects of timing in subordinate devices configured to manage the timing of self-actuated triggers using internal clock resources. The subordinate devices may be coupled to a mixed mode serial bus and may include some combination of 1-wire subordinate devices and 2-wire subordinate devices.

A first diagram illustrates the timeline 1100 for configuring and actuating triggers in multiple subordinate devices. The concepts disclosed herein apply equally to the management and implementation of self-actuated triggers at multiple subordinate devices or at a single subordinate device. In one example, a group of subordinate devices may be configured to actuate respective triggers in a timed sequence which may cause trigger actuations to be separated by a few clock cycles or by a few hundred clock cycles. In some examples, a subordinate device may be configured with trigger information relating to multiple triggers to be actuated by the subordinate device in a timed sequence which may cause trigger actuations to be separated by a few clock cycles or up to a few hundred clock cycles. For the purposes of this description, it will be assumed that each subordinate device in the group of subordinate devices is configured with one self-actuated trigger by a BoM.

The self-actuated triggers may be configured asynchronously. With reference also to FIG. 9 for example, a trigger shadow register 904 in each subordinate device may be written in any order 1102. Timing information provided to each subordinate device may be used to load a counter with a value that corresponds to a number of cycles of the transmitter clock signal used by the BoM to control communication over the mixed mode serial bus. In some implementations, the timing information indicates when counting by the counter should be initiated. In accordance with certain aspects of this disclosure, the subordinate devices may be configured to initiate counting by the counter after the timing information is successfully received or after the transaction that included the timing information has been terminated. In some implementations, the subordinate devices are configured to initiate counting by the counter after a broadcast or directed command is received over the mixed mode serial bus. In the illustrated example, the counters in all of the subordinate devices are initiated and counting 1104 after all self-actuated triggers have been configured, and the predefined count initiation condition has been indicated.

A trigger is actuated in each subordinate device after the counter in the subordinate device has reached its target. In one example, a counter may be loaded with a count value and may count down until it reaches a target value of zero. In another example, the count value is stored in a register and compared with the output of a counter that is initially cleared to zero and configured to count up. In the latter example, a comparator may indicate that the counter has reached its target when the output of the counter corresponds to the value stored in the register.

The triggers are actuated over a period of time referred to herein as the trigger window 1110. In one example, the trigger window 1110 is limited to a maximum duration of 0.25 microseconds (0.25 µs). The self-actuated triggers may be configured according to a synchronized sequence, whereby the order and temporal spacing of the triggers are defined by configuration. In the illustrated example, two triggers 1112, 1114 are configured to be actuated concurrently and four trigger actuation points are defined within the trigger window 1110.

The example illustrated by the timeline 1100 relates to a nominally performing system in which the local oscillators in the subordinate devices generate base clock signals at a nominal frequency that is a multiple of the transmitter clock signal used by the BoM. In real-world systems, the frequencies of the base clock signals can be expected to vary from subordinate device to subordinate device. The frequencies of the base clock signals in the subordinate devices can also be expected to be a non-integer multiple of the frequency of the transmitter clock signal used by the BoM. The variances can result in a timing inaccuracy for each clock cycle of the base clock signals that, while marginal for a single clock cycle, accumulate over large numbers of clock cycles and can cause a substantial divergence of timing between subordinate devices.

Divergence of timing between subordinate devices results in divergence of actual trigger actuation points from intended or reference trigger points when serial bus timing is not available to synchronize internal clock signals at the subordinate devices.

The timing diagram 1120 in FIG. 11 illustrates certain effects of timing variations that can be caused by timing inaccuracies of the base clock signals in subordinate devices. The elapsed time between initiation of counting and actuating of a trigger is shown for two triggers 1112, 1114 that are configured to be concurrently actuated by two subordinate devices 1124, 1126. For the purpose of this description, it can be assumed that counters in the two subordinate devices 1124, 1126 are initiated simultaneously, have the same initial value and the same target count value. The frequency of the base clock signal in one subordinate device (slow device 1124) is less than the nominal or desired frequency for subordinate devices. The frequency of the base clock signal in the other subordinate device (fast device 1126) is greater than the nominal or desired frequency for base clock signals in subordinate devices. The nominal point of trigger actuation 1130 is shown for a reference device 1122 operated with a nominal or desired frequency for base clock signals in subordinate devices. It can be observed from the timing diagram 1120 that the fast device 1126 actuates its trigger before the nominal point of trigger actuation 1130 and the slow device 1124 actuates its trigger after the nominal point of trigger actuation 1130.

In the illustrated example, the transmitter clock signal is configured for 52 MHz, the frequency of the base clock signal in the fast device 1126 is 10% greater than the nominal or desired frequency for base clock signals in subordinate devices, and the frequency of the base clock signal in the slow device 1124 is 10% lower than the nominal or desired frequency for base clock signals in subordinate devices. In this example, the fast device 1126 generates a receiver clock that has a frequency of for 57.2 MHz and the slow device 1124 generates a receiver clock that has a frequency of for 46.8 Mhz. The counters in the slow device 1124 and the fast device 1126 are configured to count 264 clock cycles (clock ticks). The reference device 1122 would reach its target after 5,076 ns when counting cycles of the nominal 52 MHz clock signal. The slow device 1124 reaches its target after 5,641 ns and the fast device 1126 reaches its target after 4,615 ns. That is, the fast device 1126 actuates its trigger 461 ns before the nominal point of trigger actuation 1130 and the slow device 1124 actuates its trigger 565 ns after the nominal point of trigger actuation 1130.

Figure 12:
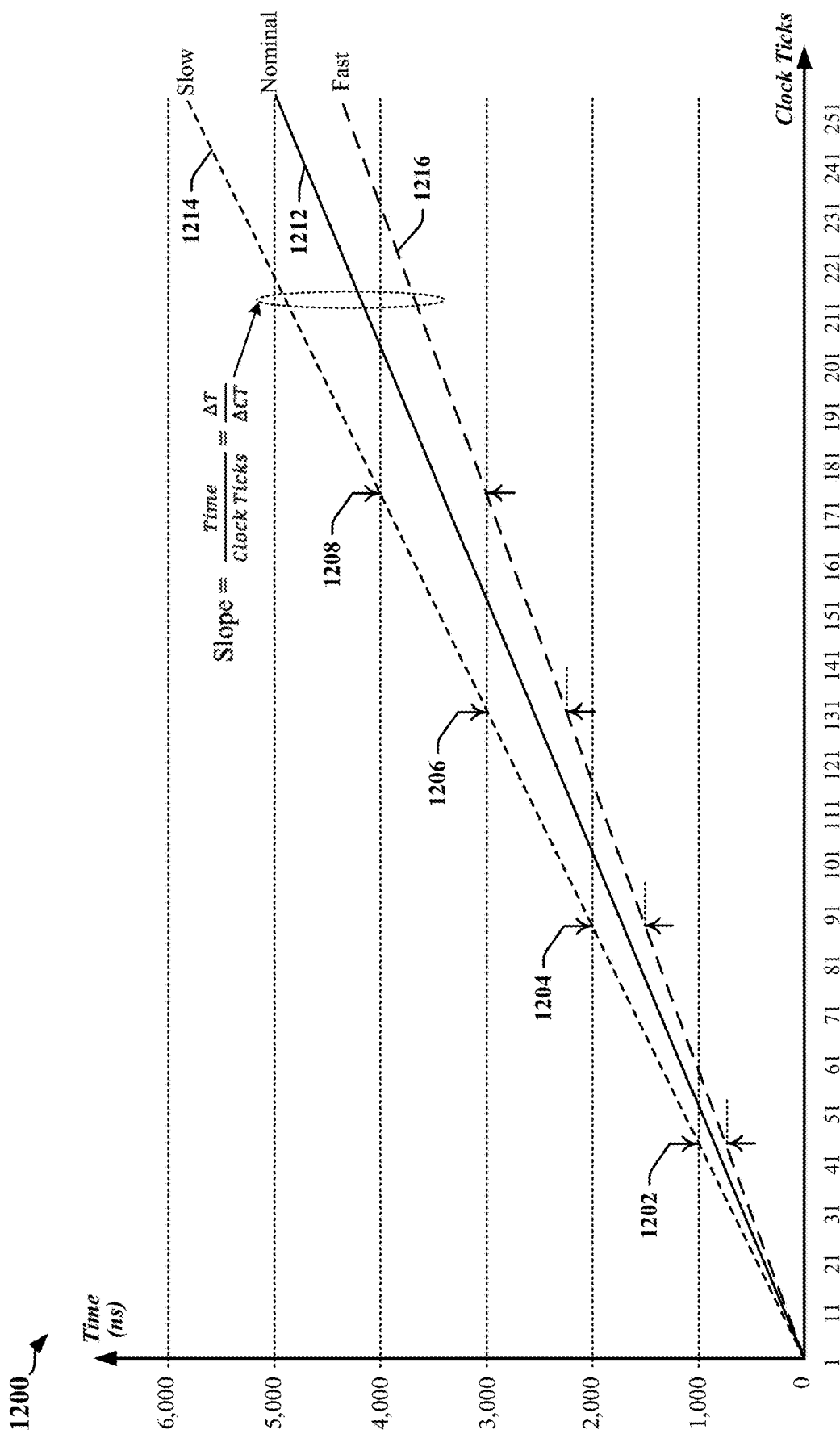
FIG. 12 illustrates the relationship between a trigger window and clock cycles counted when an internal base clock signal is used for time trigger actuation.

FIG. 12 is a graph 1200 illustrating the relationship between the size of trigger window and the number of clock cycles to be counted for subordinate devices that are coupled to a mixed mode serial bus, and that time trigger actuation using an internal base clock signal that is not synchronized to a bus clock signal derived from the serial bus. The per-cycle timing inaccuracy of the base clock signal in a subordinate device accumulates for every clock cycle counted and can constrain the trigger window 1202, 1204, 1206, 1208 for a group of triggers to a minimum duration. The size of the trigger window 1202, 1204, 1206, 1208 may become a function of clock cycle tolerances rather than being defined by application needs. It can be shown the trigger window width ($W_{TRIG}$) can be calculated as:

$$W_{TRIG} \approx 0.02 \times \left( \frac{N_{CLK\_Ticks}}{F_{R\_CLK} \times F_{VAR}} \right),$$

where:
$N_{CLK\_Ticks}$=The number of clock ticks counted,
$F_{R\_CLK}$=The reference clock frequency,
$F_{VAR}$=The maximum clock frequency variation (%).

The graph 1200 relates to the example illustrated in the timing diagram 1120 provided in FIG. 11 and shows time to target for increasing clock ticks counted. The graph 1200 illustrates the divergence of the time to target curve 1214 for the slow device 1124 and the time to target curve 1216 for the fast device 1126 with respect to the time to target curve 1212 defined for the reference device 1122.

$$\text{Slope} = \frac{\text{Time to Target}}{\text{Clock Ticks}} = \frac{\Delta T}{\Delta Clkticks}.$$

The slope of the time to target curve 1212 defined for the reference device 1122 represents the nominal or ideal trigger-slope calculated or plotted using a nominal or reference clock frequency. In one example, the reference clock frequency corresponds to the frequency of the transmitter clock signal used by the BoM to control transmissions over the mixed mode serial bus.

Certain aspects of this disclosure can improve accuracy and reliability of timed triggers managed by 1-wire subordinate devices and/or 2-wire subordinate devices coupled to a mixed mode serial bus. In one aspect, subordinate devices may use a locally generated clock signal for timed-trigger operations. The locally generated clock signal may be used when a reference clock signal is unavailable, including when a clock signal or embedded clock signal is not received from the serial bus. In one aspect, 1-wire subordinate devices can manage timing of self-actuating triggers without blocking the operation of 2-wire subordinate devices coupled to the same serial bus by eliminating the need for bus supplied reference timing.

Certain aspects of the disclosure enable subordinate devices to accommodate and correct differences in slope of their time to target curves 1214, 1216 in order to more closely match the slope of the nominal time to target curve 1212 defined for a reference device 1122. The slope of the nominal the time to target curve 1212 is calculated based on a reference clock. In the example of a mixed mode serial bus operated in accordance with RFFE protocols, the reference clock corresponds to the transmitter clock that defines data transmission rate over the serial bus.

For ideal operation, the slope of target curves 1214, 1216 should equal the slope of the nominal target curve 1212. In one example, a positive slope correction may be applied to the slope of the time to target curve 1216 for the fast device 1126 (i.e., slope is increased). In another example, a negative slope correction may be applied to the slope of the time to target curve 1214 for the slow device 1124 (i.e., slope is decreased).

According to certain aspects of this disclosure, trigger slope correction factors can be provided to subordinate devices through messaging transmitted over the serial bus. The trigger slope correction factors can be sent in individual messages and can be provided independently of messages conveying trigger configuration or trigger timing information. The trigger slope correction factors may be applied according to one or more algorithms, at predefined intervals, and/or at certain points during trigger timing configured by a BoM or determined at the subordinate device.

Figure 13:
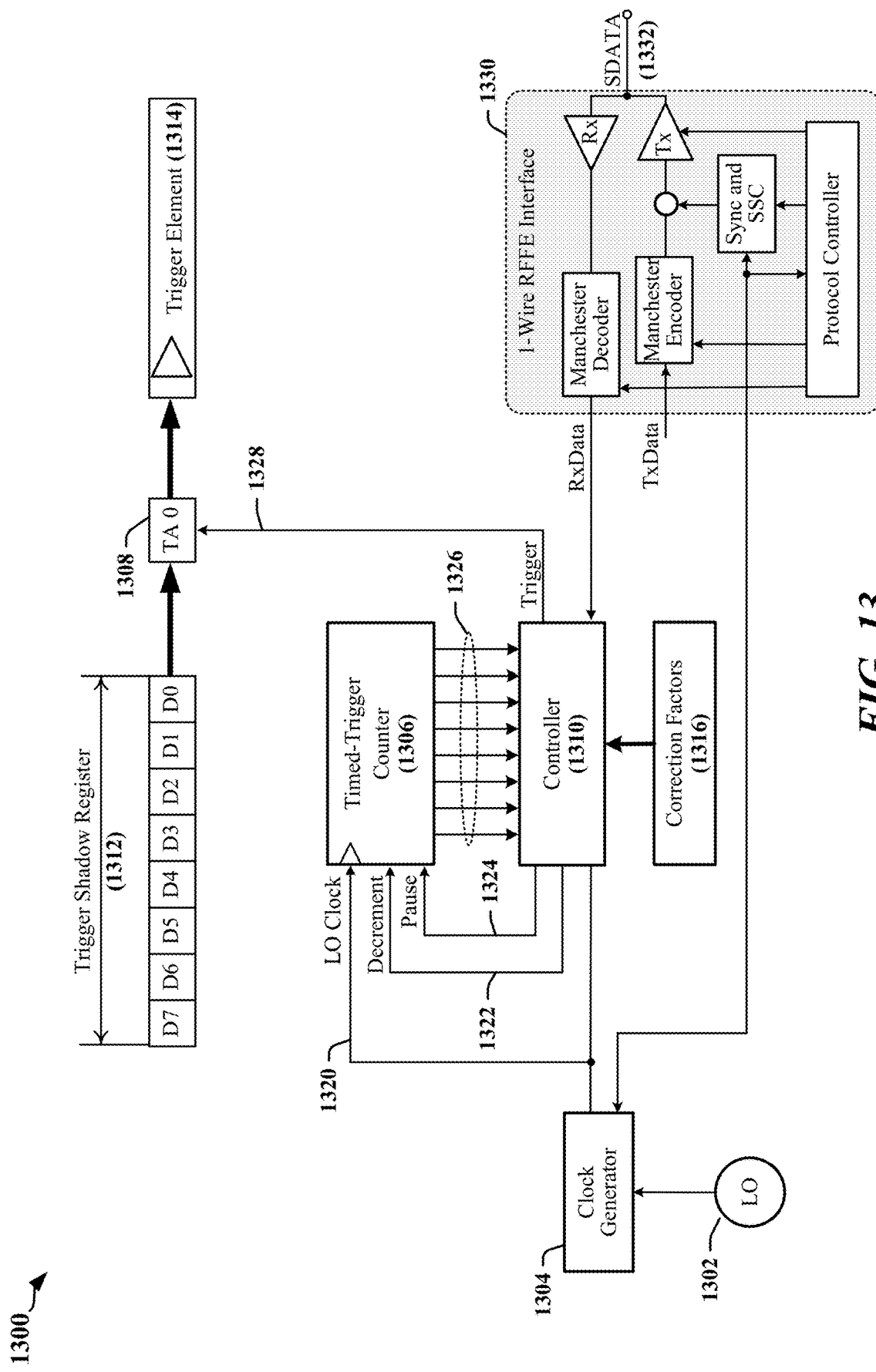
FIG. 13 illustrates an example of a trigger timing circuit that may be configured in accordance with certain aspects of this disclosure.

FIG. 13 is a schematic representation of a 1-wire subordinate device 1300 that includes an RFFE interface 1330 and a trigger timing circuit that may be configured in accordance with certain aspects of this disclosure. The illustrated trigger timing circuit is provided by way of example for the purpose of illustrating certain concepts disclosed herein. Other configurations of components may be used to provide a trigger timing circuit that operates in accordance with certain aspects of this disclosure.

In the illustrated example, the trigger timing circuit includes a controller 1310 that is configured to manage and implement self-actuating or timed triggers. The controller 1310 may be implemented using a processor, microcontroller or finite state machine. In some implementations, the controller 1310 and may be provided in a processing circuit that is used to control transmit and receive functions and to communicate with a BoM over a serial bus. In some instances, the controller 1310 may receive trigger configuration information and may load a trigger shadow register 1312 and/or a timed-trigger counter 1306. In other implementations, the controller 1310 may receive a signal that indicates the trigger shadow register 1312 and/or the timed-trigger counter 1306 have been loaded. The controller 1310 may cause the timed-trigger counter 1306 to begin counting in accordance with timing information provided with the receive trigger configuration information, in response to a command received from the BoM or after the trigger shadow register 1312 has been loaded.

The timed-trigger counter 1306 is clocked by a base clock signal 1320 derived from a local oscillator 1302. A clock generation circuit 1304 may be used to condition, divide or otherwise adjust an output of the local oscillator 1302 in order to derive the base clock signal 1320, phase-shifted versions of the base clock signal 1320 and/or one or more clock signals that have a nominal frequency that corresponds to the nominal frequency of a BoM transmitter clock signal or other reference signal.

The controller 1310 may provide one or more signals 1322, 1324 that can configure or adjust the operation of the timed-trigger counter 1306. The timed-trigger counter 1306 may be implemented as an up/down counter and may provide a count value 1326 as an output. The controller 1310 may be configured to monitor the count value 1326 and to generate a trigger signal 1328 when the count value 1326 reaches a target value for actuating a trigger 1308 associated with a trigger element 1314. In some implementations, the counter 1306 may generate the trigger signal 1328 directly when, for example, the count value 1326 reaches zero or when the counter 1306 overflows.

The controller 1310 may be coupled to a register or other storage that maintains trigger slope correction factors 1316 that can be used to adjust slope of a time to target curve that characterizes the count rate of the counter 1306 in order to more closely match the slope of a nominal time to target curve defined for a reference device. In one example, the trigger slope correction factors 1316 can be configured to adjust for differences in frequency between the BoM transmitter clock signal or reference signal and the base clock signal 1320 or another clock signal generated by the clock generation circuit 1304. In certain examples, the controller 1310 may be configured to modify the current count value 1326, cause the counter 1306 to pause counting or otherwise modify the rate of counting based on preloaded trigger slope correction factors 1316.

According to certain aspects of this disclosure, a BoM in a host device may determine trigger slope correction factors for multiple subordinate devices coupled to a serial bus. Each subordinate device may be configured to measure the duration of a measurement pulse transmitted over by the BoM. In some implementations, the subordinate device measures the duration of the measurement pulse using a counter to count clock ticks defined by an internally-generated clock signal. In one example, each clock tick corresponds to a cycle of the internally-generated clock signal. In another example, each clock tick corresponds to an edge of the internally-generated clock signal. In the latter example, the counter may count rising edges, falling edges or both rising edges and falling edges in the internally-generated clock signal. In one implementation, the counter corresponds to the timed-trigger counter 1306 of the trigger timing circuit illustrated in FIG. 13 and the internally-generated clock signal corresponds to base clock signal 1320 of the trigger timing circuit.

Figure 14:
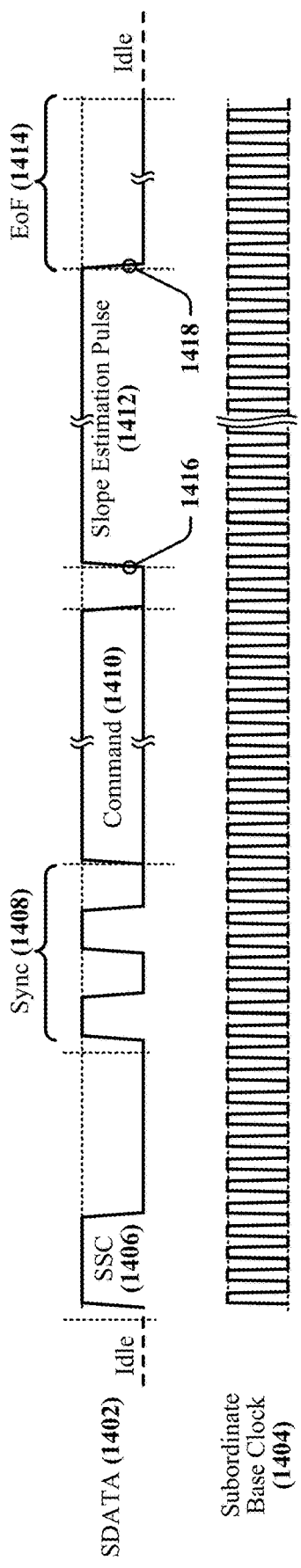
FIG. 14 illustrates trigger slope correction factors for multiple subordinate devices in accordance with certain aspects of this disclosure.
Figure 14:
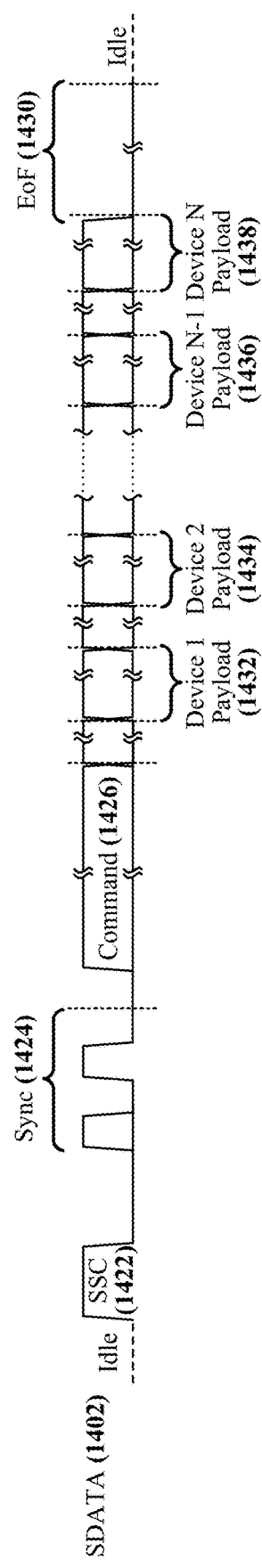

FIG. 14 illustrates one example in which trigger slope correction factors for multiple subordinate devices can be determined by a BoM and can be provided to the subordinate devices for use in timing trigger actuation in accordance with certain aspects of this disclosure.

A first timing diagram 1400 in FIG. 14 illustrates a slope estimation transaction addressed to one or more 1-wire subordinate devices coupled to a serial bus. The serial bus may be operated in accordance with certain aspects of this disclosure. In the illustrated example, the transaction is a broadcast transaction and is initiated when a BoM transmits an SSC 1406 over the single wire of the serial bus (here, designated as SDATA 1402). A synchronization pattern 1408 is transmitted after the SSC 1406 and is followed in transmission by a command 1410. The command is recognized as a slope estimation broadcast command by any active 1-wire subordinate devices coupled to the serial bus. In other examples, a directed slope estimation command may be addressed to a single subordinate device or to a group address shared by multiple subordinate devices. SDATA 1402 is in a low signaling state or is driven to the low signaling state after the command 1410 has been transmitted.

A measurement pulse (the slope estimation pulse 1412) is transmitted, typically within one or two BoM transmitter clock cycles after transmission of the command 1410 has been completed. A rising edge 1416 in the slope estimation pulse 1412 causes a counter to begin counting in each subordinate device that responded to the command 1410. The counter may be configured to count clock ticks defined by an internally-generated clock signal. In some implementations, the internally-generated clock signal may be a base clock signal 1404 that is generated by the subordinate device with a frequency that as a multiple of the frequency of the BoM transmitter clock. In some implementations, the internally-generated clock signal has a nominal frequency that is the same as the nominal frequency of the BoM transmitter clock. A falling edge 1418 in the slope estimation pulse 1412 causes the counter in each subordinate device to cease counting. The transaction may then be terminated using end-of-frame signaling (EoF 1414). Each participating subordinate device maintains a copy of the slope estimation final count value output by its respective counter.

A second timing diagram 1420 in FIG. 14 illustrates readback of slope estimation final count values captured and maintained by one or more subordinate devices after a slope estimation transaction has been executed. Readback may be accomplished using one or more transactions. The BoM transmits an SSC 1422 over SDATA 1402 followed by a synchronization pattern 1424. The BoM then transmits read commands 1426 addressed to the subordinate devices. Only one read command 1426 is shown in the illustrated example. The transmission of line turnaround signaling and additional synchronization patterns is not explicitly shown. Line turnaround signaling and synchronization patterns are transmitted, for example, after a read command is transmitted over SDATA 1402 and a subordinate device is to respond to the read command by transmitting a signal over SDATA 1402.

In the illustrated example, each subordinate device that receives a read command directed to readback of slope estimation final count value captured during a slope estimation transaction responds to a read command by transmitting its slope estimation final count value. Accordingly, payloads 1432, 1434, 1436, 1438 are transmitted by corresponding subordinate devices over SDATA 1402. Each readback transaction is terminated by end-of-frame signaling (EoF 1430).

The BoM or a host device that receives the slope estimation final count values may calculate or estimate trigger slope correction factors that can be used by the subordinate devices reporting the slope estimation final count values. The BoM or host device may determine trigger slope correction factors based on a difference between the BoM transmitter clock signal frequency and the frequency of the base clock signals available to the subordinate devices. In certain implementations, the BoM or host device may calculate trigger slope correction factors as the difference between the number of cycles of the BoM transmitter clock signal used to transmit the slope estimation pulse 1412 and the slope estimation final count values obtained by the subordinate devices.

Trigger slope correction factors obtained in accordance with certain aspects of this disclosure can be optimized or improved by counting cycles of a higher frequency base clock signal to measure the slope estimation pulse 1412. In some implementations, a 1-wire subordinate device generates an internal base clock signal with a frequency that is four times (4×) the frequency of the BoM transmitter clock signal in order to recover clock information from Manchester-encoded data signals. The 4× base clock signal may be used to measure the slope estimation pulse 1412 with greater granularity and can enable trigger slope correction factors to be used over longer trigger timing intervals. In some implementations, a counter may be configured to count rising edges and falling edges in the 4× base clock signal when the slope estimation pulse 1412 is being measured. The BoM or host device may employ multipliers to obtain the reference clock ticks (cycles or edges) used for calculating trigger slope correction factors when a 4× base clock signal is available and used at the subordinate device and/or when the subordinate device counts rising and falling edges when measuring the slope estimation pulse 1412.

In one example, a trigger slope correction factor may be obtained in accordance with certain aspects of this disclosure for a slope estimation pulse 1412 that has a duration of 256 cycles of the BoM transmitter clock signal ($C_T$=256). In an ideal system, the slope estimation pulse 1412 is measured by the subordinate device as having 256 cycles of the base clock signal ($K_T$=256). Accordingly, $K_T/C_T$=1. A trigger slope correction factor may be calculated when $K_T/C_T \neq 1$.

A subordinate device that generates an internal base clock signal with a frequency that is higher than the frequency of the BoM transmitter clock signal may report a slope estimation pulse 1412 measurement of 260 cycles of the faster base clock signal ($K_T$=260), indicating a $K_T/C_T$=260/256=1.016. The host or BoM may calculate a trigger slope correction factor of 260−256=4 indicating that 4 clock cycles are to be ignored in a 256-cycle countdown period in order to restore $K_T/C_T$=260/256=1.0156.

A subordinate device that generates an internal base clock signal with a frequency that is lower than the frequency of the BoM transmitter clock signal may report a slope estimation pulse 1412 measurement of 250 cycles of the slower base clock signal ($K_T$=250), indicating a $K_T/C_T$=260/256=1.962. The host or BoM may calculate a trigger slope correction factor of 260−256=6 indicating that 6 clock cycles are to be added to the clock cycles that are actually counted in a 256-cycle countdown period.

Figure 15:
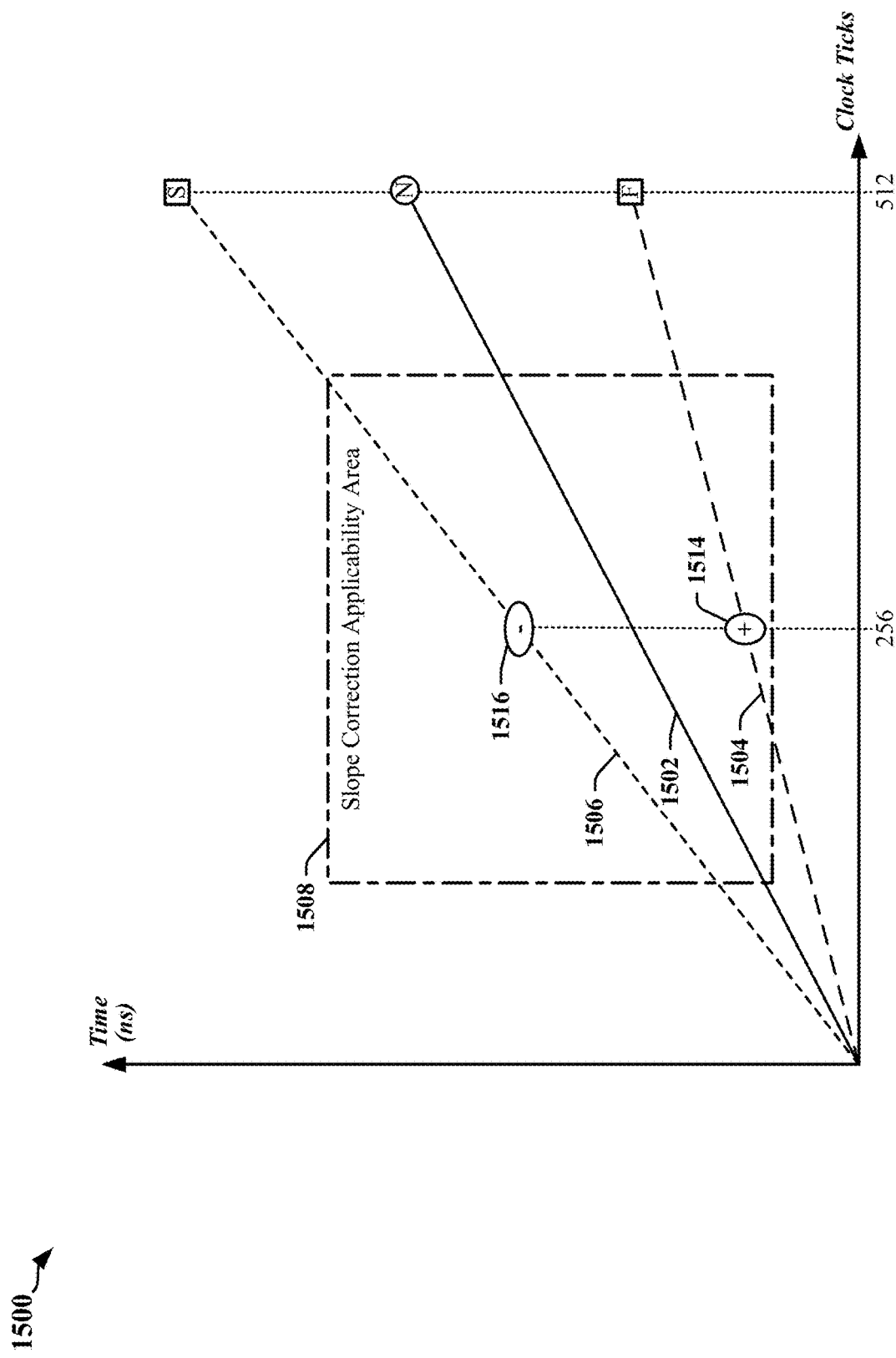
FIG. 15 illustrates the application of trigger slope correction factors calculated in accordance with certain aspects of this disclosure.

FIG. 15 is a graph 1500 that illustrates the application of trigger slope correction factors calculated in accordance with certain aspects of this disclosure. The graph 1500 depicts the relationship between time elapsed and the number of clock cycles counted by different subordinate devices. A first time to target curve 1502 is characterized with a $K_T/C_T$=1 and relates to a subordinate device that measures a slope estimation pulse 1412 using a base clock signal that has the same frequency as the BoM transmitter clock signal. A second time to target curve 1504 is characterized with a $K_T/C_T \neq 1$ and relates to a subordinate device that measures a slope estimation pulse 1412 using a base clock signal that has a frequency that is greater than the frequency of the BoM transmitter clock signal. A third time to target curve 1506 is characterized with a $K_T/C_T \neq 1$ and relates to a subordinate device that measures a slope estimation pulse 1412 using a base clock signal that has a frequency that is less than the frequency of the BoM transmitter clock signal.

In certain implementations, trigger slope correction factors may be applied within a slope correction applicability area 1508 that may be measured in clock cycles. In the illustrated example, the trigger slope correction factors may be applied at times 1514, 1516 when 256 clock cycles have been counted from a total programmed count of 512. Applying the trigger slope correction factors at the mid-point of counting can minimize the maximum trigger window. In other examples, trigger slope correction factors may be applied in multiple steps throughout the slope correction applicability area 1508. For example, the application of the trigger slope correction factors after every 256 clock ticks can simplify the logic needed to add or subtract trigger slope correction factor values. The value of each of the 8 least significant bits of the counter is zero value when the count is at 256 or a multiple of 256. Accordingly, a non-zero trigger slope correction factor can be loaded into the 8 least significant bits of the counter to compensate for a slow base clock signal. Application of trigger slope correction factors for a fast base clock signal can be accomplished by suppressing the clock signal provided to the counter for one or more clock ticks.

In accordance with certain aspects of this disclosure, the number of opportunities to apply trigger slope correction factors can be increased through the use of a base clock signal with a frequency that is a multiple of the frequency of the BoM transmitter clock signal. In one example, twice as many opportunities to apply trigger slope correction factors are available when the trigger slope correction factors are applied after every 256 clock ticks and when the base clock signal has a frequency that is twice the frequency of the BoM transmitter clock signal. In another example, four times as many opportunities to apply trigger slope correction factors are available when the trigger slope correction factors are applied after every 256 clock ticks and when the base clock signal has a frequency that is four times the frequency of the BoM transmitter clock signal. The latter can be implemented in a 1-wire subordinate device that already generates its base clock signal with a frequency that is four times the frequency of the BoM transmitter clock signal.

A BoM or host device can take advantage of the availability of higher-frequency base clock signals when the counter in the subordinate devices measures the slope estimation pulse 1412 by counting cycles or edges of the higher-frequency base clock signals. The BoM or host device can then calculate trigger slope correction factors using cycle counts corresponding to the increased frequency.

Certain aspects of this disclosure relate to the protocol used to write trigger configuration information to subordinate devices that are configured to manage timed trigger actuation. In one example, the trigger configuration information includes information that is to be written to trigger shadow registers of the subordinate devices. In another example, the trigger configuration information includes timing information that is to be written to timed-trigger counters of the subordinate devices. In another example, the trigger configuration information includes information that causes counters to begin counting down to a trigger event.

Figure 16:
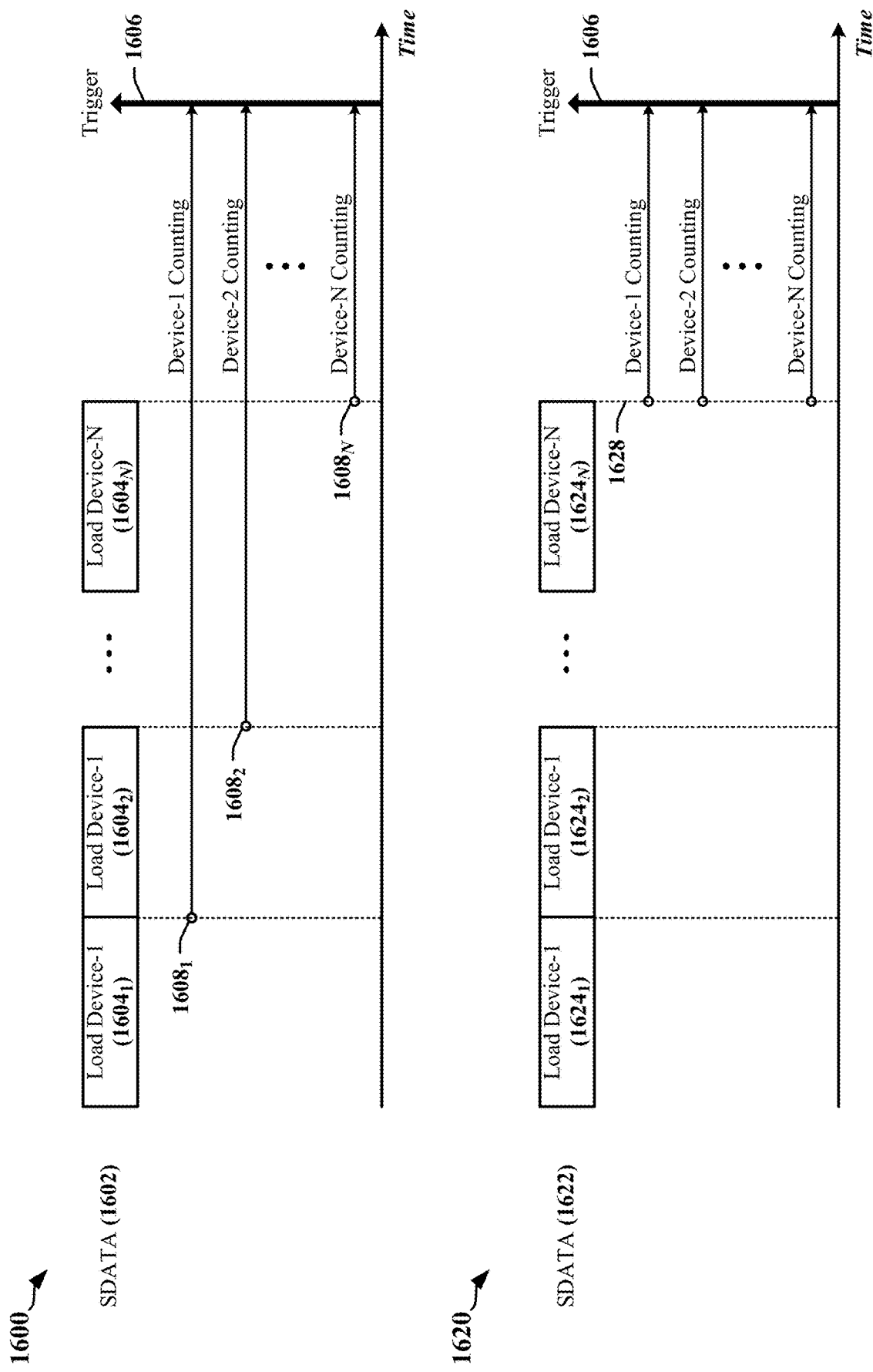
FIG. 16 illustrates communication of trigger configuration information in accordance with certain aspects of this disclosure.

FIG. 16 includes a timing diagram 1600 that illustrates the writing of trigger configuration information according to conventional RFFE protocols. A BoM may use one or more transactions to write trigger configuration information to a set of N subordinate devices. In the illustrated example, The BoM transmits individual commands and payloads 1604$_1$-1604$_N$ over SDATA 1602 to the N subordinate devices in a configured sequence to configure triggers that are to be actuated a common point in time 1606. According to conventional RFFE protocols, each of the N subordinate devices begins their configured countdowns at a point in time 1608$_1$-1608$_N$ defined by the completion of receipt of the corresponding command and payload 1604$_1$-1604$_N$. The BoM is required to calculate individual countdown values for each of the N subordinate devices and relies on successful writing of the sequence of payloads 1604$_1$-1604$_N$ to ensure that triggers are actuated at the expected point in time 1606.

Each subordinate device in a group of subordinate devices can be configured in accordance with certain aspects disclosed herein to begin countdown after all subordinate devices have been configured with timed-trigger information. As illustrated in the timing diagram 1620 in FIG. 16, a BoM may use one or more transactions to write trigger configuration information to a set of N subordinate devices. In the illustrated example, The BoM transmits individual commands and payloads 16241-1624N over SDATA 1622 to the N subordinate devices to configure triggers that are to be actuated a common point in time 1606. No particular sequence need be defined for writing the payloads 16241-1624N. According to conventional RFFE protocols, each of the N subordinate devices begins their configured countdowns at a target point in time 1608 defined by the completion of transmission of the last command and payload 1604N. The BoM can calculate countdown values for each of the N subordinate devices based on a common countdown duration and target point in time 1608.

Examples of Processing Circuits and Methods

Figure 17:
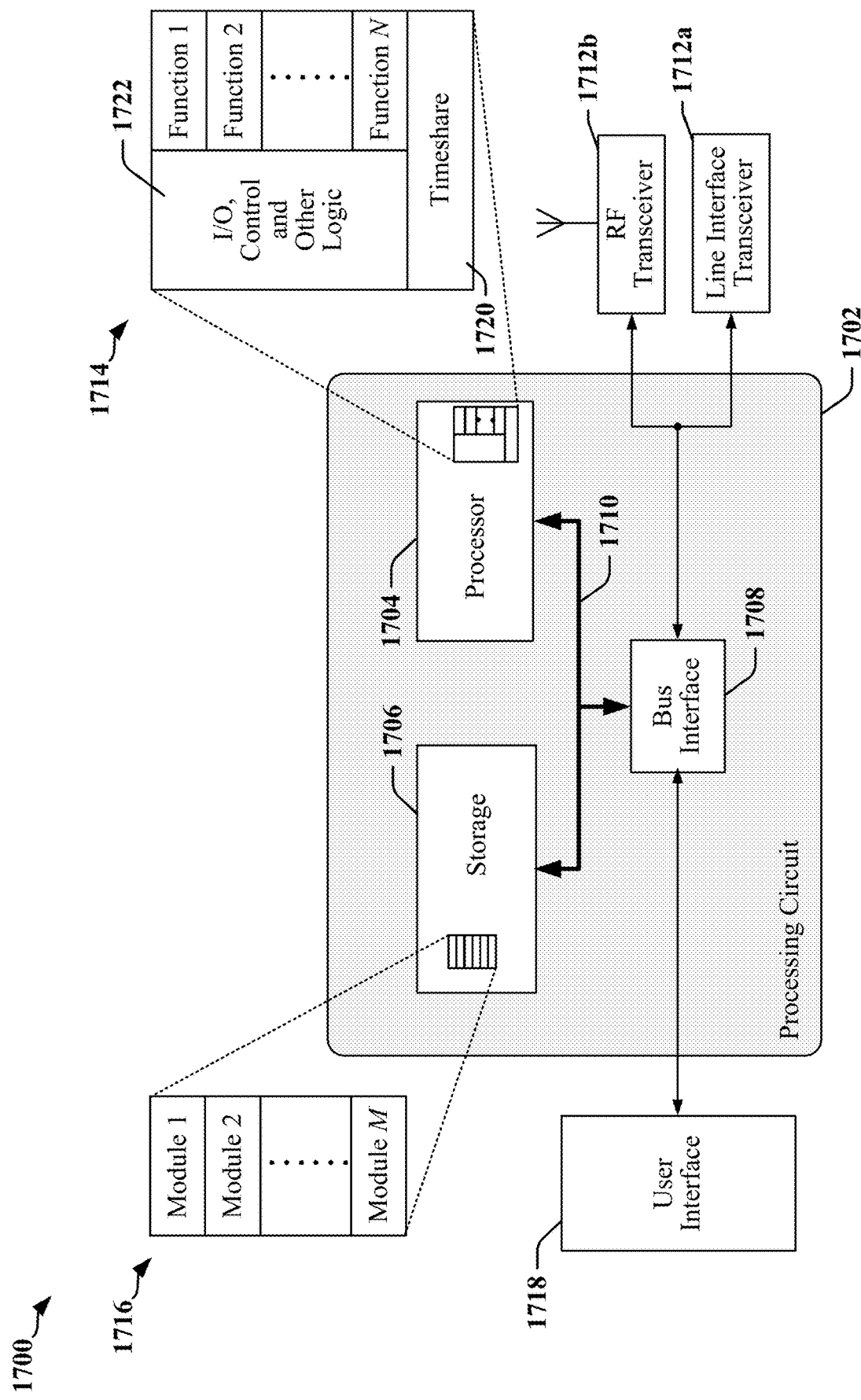
FIG. 17 illustrates one example of an apparatus employing a processing circuit that may be adapted according to certain aspects disclosed herein.

FIG. 17 is a diagram illustrating an example of a hardware implementation for an apparatus 1700. In some examples, the apparatus 1700 may perform one or more functions disclosed herein. In accordance with various aspects of the disclosure, an element, or any portion of an element, or any combination of elements as disclosed herein may be implemented using a processing circuit 1702. The processing circuit 1702 may include one or more processors 1704 that are controlled by some combination of hardware and software modules. Examples of processors 1704 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable storage media and/or processor-readable storage media. The bus 1710 may also link various other circuits such as timing sources, timers, peripherals, voltage regulators, and power management circuits. A f 1708 may provide an interface between the bus 1710 and one or more transceivers 1712*a*, 1712*b*. A transceiver 1712*a*, 1712*b* may be provided for each networking technology supported by the processing circuit. In some instances, multiple networking technologies may share some or all of the circuitry or processing modules found in a transceiver 1712*a*, 1712*b*. Each transceiver 1712*a*, 1712*b* provides a means for communicating with various other apparatus over a transmission medium. In one example, a transceiver 1712*a* may be used to couple the apparatus 1700 to a multi-wire bus. In another example, a transceiver 1712*b* may be used to connect the apparatus 1700 to a radio access network. Depending upon the nature of the apparatus 1700, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a processor-readable storage medium that may include the illustrated storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external processor-readable storage medium. The external processor-readable storage medium and/or storage 1706 may include a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The processor-readable storage medium and/or storage 1706 may also include, by way of example, a carrier wave, a transmission line, and any other suitable medium for transmitting software and/or instructions that may be accessed and read by a computer. Processor-readable storage medium and/or the storage 1706 may reside in the processing circuit 1702, in the processor 1704, external to the processing circuit 1702, or be distributed across multiple entities including the processing circuit 1702. The processor-readable storage medium and/or storage 1706 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as a transceiver 1712*a*, 1712*b*, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to a transceiver 1712*a*, 1712*b*, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712*a*, 1712*b*, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

The processing circuit 1702 may be configured to perform one or more of the functions disclosed herein. For example, the processing circuit 1702 may be configured to operate as a master device coupled to a serial bus. The processing circuit 1702 may be configured to initiate a pulse on a wire coupling the processing circuit 1702 to a subordinate device, present a high impedance to the wire after initiating the pulse and determine whether a subordinate device has terminated the pulse early, indicating a first encoded value. When the subordinate device has not terminated the pulse, processing circuit 1702 may be configured to terminate the pulse after a duration of time sufficient to indicate a second encoded value. In one example, the first encoded value is assigned binary 1 and the second encoded value is assigned binary 0. In another example, the first encoded value is assigned binary 0 and the second encoded value is assigned binary 1. The processing circuit 1702 may be configured to determine the encoded value or may employ a separate PWM decoder.

Figure 18:
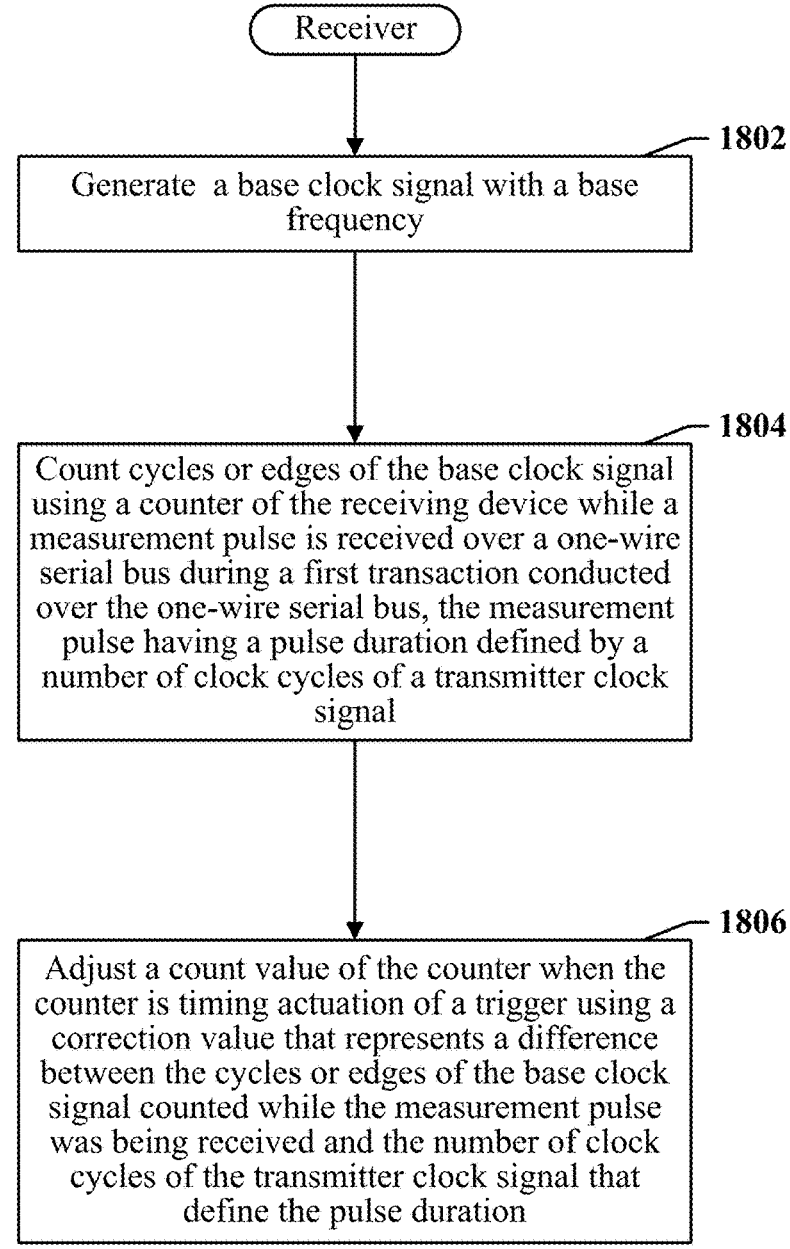
FIG. 18 is a flowchart that illustrates a method for timing triggers in a receiving device in accordance with certain aspects disclosed herein.

FIG. 18 is a flowchart 1800 of a method for timing triggers that may be performed by a subordinate receiving device coupled to one wire (SDATA) of a mixed mode or multi-mode serial bus. One or more 1-wire subordinate devices and one or more 2-wire subordinated devices may be coupled to the multi-mode serial bus. A host device may exchange Manchester-encoded data with 1-wire subordinate devices. The host device may transmit Manchester-encoded data and commands to the 1-wire subordinate devices over the data line of the multi-mode serial bus.

At block 1802, the receiving device may generate a base clock signal. At block 1804, the receiving device may count cycles or edges of the base clock signal using a counter of the receiving device while a measurement pulse is received over a one-wire serial bus during a first transaction conducted over the one-wire serial bus, the measurement pulse having a pulse duration defined by a number of clock cycles of a transmitter clock signal. At block 1806, the receiving device may adjust a count value of the counter when the counter is timing actuation of a trigger using a correction value that represents a difference between the cycles or edges of the base clock signal counted while the measurement pulse was being received and the number of clock cycles of the transmitter clock signal that defines the pulse duration.

In some implementations, the receiving device may receive a Manchester-encoded command over the one-wire serial bus. The receiving device may receive the measurement pulse after the Manchester-encoded command is received. The Manchester-encoded command may indicate that the measurement pulse is to be provided. The Manchester-encoded command may be received in a datagram configured in accordance with RFFE protocols. The transmitter clock signal may be embedded in the Manchester-encoded command.

In some implementations, the base clock signal has a frequency that is a multiple of a frequency of the transmitter clock signal.

In certain examples, adjusting the count value of the counter includes increasing the count value of the counter when the base clock signal has a frequency that is less than a frequency of the transmitter clock signal. Adjusting the count value of the counter may include decreasing the count value of the counter when the base clock signal has a frequency that is greater than a frequency of the transmitter clock signal.

In some implementations, the receiving device may configure a trigger shadow register using trigger information received in a second transaction conducted over the one-wire serial bus, and configure the counter with an initial count value using timing information received in the second transaction. The receiving device may be one of a plurality of receiving devices coupled to the one-wire serial bus. Each of the plurality of receiving devices may be configured by trigger and timing information received in the second transaction. Each of the plurality of receiving devices may be configured to initiate timing of actuation of a corresponding trigger when the second transaction is terminated.

In some implementations, the receiving device may adjust the count value of the counter includes periodically adjusting the count value of the counter using the correction value when the counter is timing actuation of the trigger. Periodically adjusting the count value of the counter may include adjusting the count value of the counter with a periodicity determined by a frequency of the base clock signal.

Figure 19:
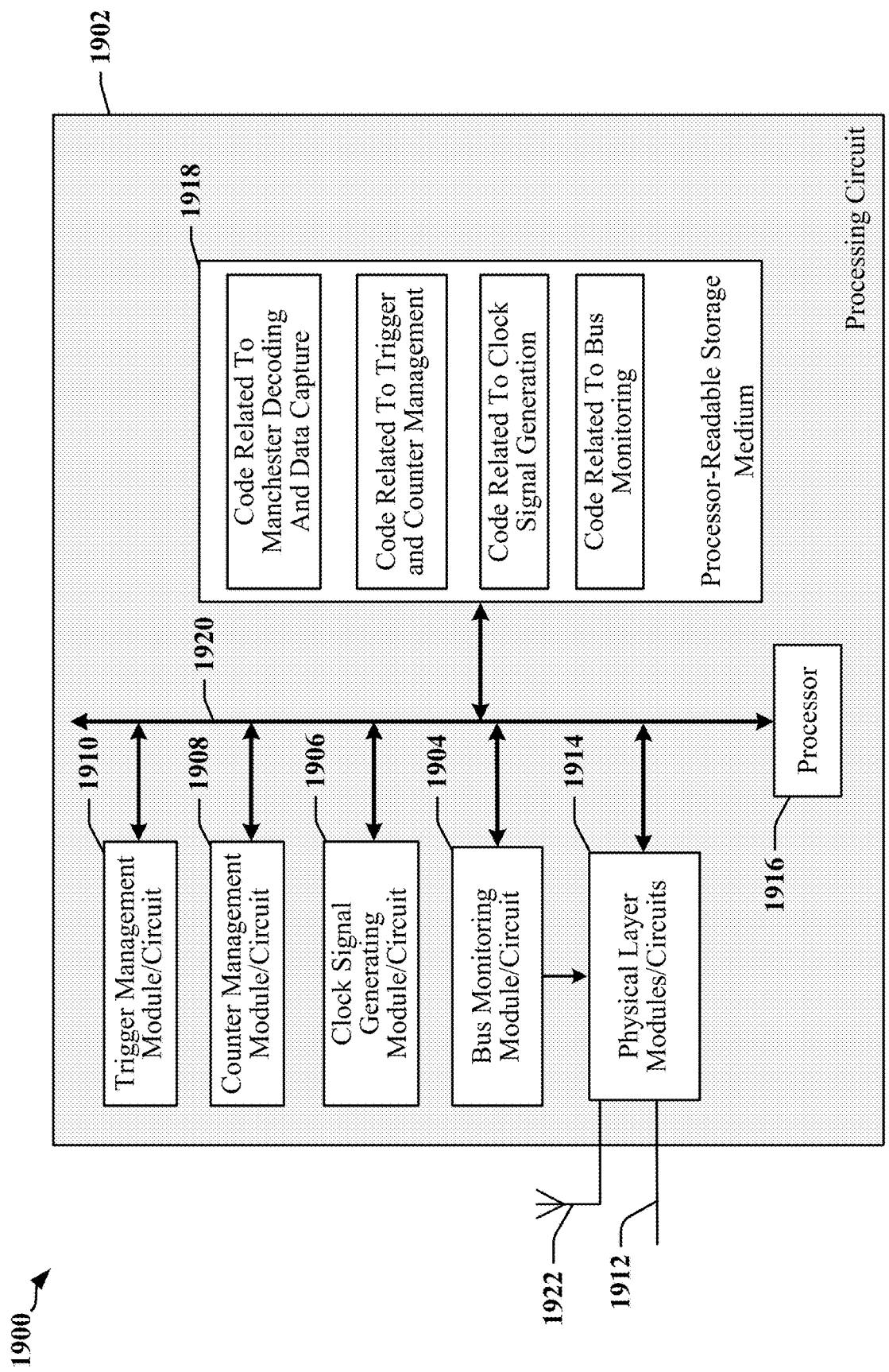
FIG. 19 illustrates an example of a hardware implementation for an apparatus adapted in accordance with certain aspects disclosed herein.

FIG. 19 is a diagram illustrating an example of a hardware implementation for an apparatus 1900 employing a processing circuit 1902. The processing circuit typically has a controller or processor 1916 that may include one or more microprocessors, microcontrollers, digital signal processors, sequencers and/or state machines. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the controller or processor 1916, the modules or circuits 1904, 1906, 1908 and 1910 and the processor-readable storage medium 1918. One or more physical layer circuits and/or modules 1914 may be provided to support communication over a communication link implemented using a multi-wire bus 1912, through an antenna or antenna array 1922 (to a radio access network for example), and so on. The bus 1920 may also link various other circuits such as timing sources, peripherals, voltage regulators, and power management circuits, which are well known in the art, and therefore, will not be described any further.

The processor 1916 is responsible for general processing, including the execution of software, code and/or instructions stored on the processor-readable storage medium 1918. The processor-readable storage medium 1918 may include a non-transitory storage medium. The software, when executed by the processor 1916, causes the processing circuit 1902 to perform the various functions described herein, and for any particular apparatus. The processor-readable storage medium 1918 may be used for storing data that is manipulated by the processor 1916 when executing software. The processing circuit 1902 further includes at least one of the modules 1904, 1906, 1908 and 1910. The modules 1904, 1906, 1908 and 1910 may be software modules running in the processor 1916, resident/stored in the processor-readable storage medium 1918, one or more hardware modules coupled to the processor 1916, or some combination thereof. The modules 1904, 1906, 1908 and 1910 may include microcontroller instructions, state machine configuration parameters, or some combination thereof.

In one configuration, the apparatus 1900 includes modules and/or circuits 1904 adapted to monitor a one-wire bus for activity, inactivity and control signaling. The apparatus 1900 further includes modules and/or circuits 1906 adapted to generate or control the generation of one or more internal base clock signals to be used for decoding a signal received over the one-wire bus. The apparatus 1900 further includes modules and/or circuits 1908 configured to manage counter operation during trigger timing operations. The apparatus 1900 further includes modules and/or circuits 1910 adapted to manage trigger configuration and actuation.

In one example, the apparatus 1900 includes a clock generator circuit configured to generate a base clock signal that has a base frequency, a counter configured to count cycles or edges of the base clock signal while a measurement pulse is received over a one-wire serial bus during a first transaction conducted over the one-wire serial bus. The measurement pulse has a pulse duration that may be defined by a number of clock cycles of a transmitter clock signal. The apparatus 1900 also includes a controller configured to adjust a count value of the counter when the counter is timing actuation of a trigger using a correction value that represents a difference between the cycles or edges of the base clock signal counted while the measurement pulse was being received and the number of clock cycles of the transmitter clock signal that defines the pulse duration.

In certain examples, the measurement pulse is received after an associated Manchester-encoded command is received over the one-wire serial bus. The Manchester-encoded command may be received in a datagram configured in accordance with a RFFE protocol. The transmitter clock signal may be embedded in the Manchester-encoded command. In one example, the base clock signal has a frequency that is a multiple of a frequency of the transmitter clock signal.

In certain examples, the controller is further configured to increase the count value of the counter when the base clock signal has a frequency that is less than a frequency of the transmitter clock signal. The controller may be further configured to decrease the count value of the counter when the base clock signal has a frequency that is greater than a frequency of the transmitter clock signal.

In some examples, the receiving device has a trigger shadow register configured by trigger information received in a second transaction conducted over the one-wire serial bus. The counter may be configured with an initial count value using timing information received in the second transaction. The receiving device may be one of a plurality of receiving devices coupled to the one-wire serial bus. Each of the plurality of receiving devices may be configured by trigger and timing information received in the second transaction. Each of the plurality of receiving devices may be configured to initiate timing of actuation of a corresponding trigger when the second transaction is terminated.

In certain examples, the controller is further configured to periodically adjust the count value of the counter using the correction value when the counter is timing actuation of the trigger. The controller may adjust the count value of the counter with a periodicity determined by a frequency of the base clock signal.

The processor-readable storage medium 1918 stores code and data. The code may be executed by the processor 1916, a state machine or sequencer. The code, when executed by the processor 1916, causes the processing circuit 1902 to configure an oscillator or clock generator circuit to generate a base clock signal, count cycles or edges of the base clock signal using a counter of the receiving device while a measurement pulse is received over a one-wire serial bus during a first transaction conducted over the one-wire serial bus, the measurement pulse having a pulse duration defined by a number of clock cycles of a transmitter clock signal, and adjust a count value of the counter when the counter is timing actuation of a trigger using a correction value that represents a difference between the cycles or edges of the base clock signal counted while the measurement pulse was being received and the number of clock cycles of the transmitter clock signal that defines the pulse duration.

In some implementations, the code causes the processing circuit 1902 to receive a Manchester-encoded command over the one-wire serial bus, and receive the measurement pulse after the Manchester-encoded command is received. The Manchester-encoded command may indicate that the measurement pulse is to be provided. The Manchester-encoded command may be received in a datagram configured in accordance with RFFE protocols. The transmitter clock signal may be embedded in the Manchester-encoded command. In one example, the base clock signal has a frequency that is a multiple of a frequency of the transmitter clock signal.

In certain implementations, adjusting the count value of the counter includes increasing the count value of the counter when the base clock signal has a frequency that is less than a frequency of the transmitter clock signal. Adjusting the count value of the counter may include decreasing the count value of the counter when the base clock signal has a frequency that is greater than a frequency of the transmitter clock signal.

In some implementations, the code causes the processing circuit 1902 to configure a trigger shadow register using trigger information received in a second transaction conducted over the one-wire serial bus, and to configure the counter with an initial count value using timing information received in the second transaction. The receiving device may be one of a plurality of receiving devices coupled to the one-wire serial bus. Each of the plurality of receiving devices is configured by trigger and timing information received in the second transaction. Each of the plurality of receiving devices may be configured to initiate timing of actuation of a corresponding trigger when the second transaction is terminated.

In some instances, adjusting the count value of the counter includes periodically adjusting the count value of the counter using the correction value when the counter is timing actuation of the trigger. Periodically adjusting the count value of the counter may include adjusting the count value of the counter with a periodicity determined by a frequency of the base clock signal.

Some implementation examples are described in the following numbered clauses:

1. A receiving device, comprising: a clock generator circuit configured to generate a base clock signal; a counter configured to count cycles or edges of the base clock signal while a measurement pulse is received over a one-wire serial bus during a first transaction conducted over the one-wire serial bus, the measurement pulse having a pulse duration defined by a number of clock cycles of a transmitter clock signal; and a controller configured to adjust a count value of the counter when the counter is timing actuation of a trigger using a correction value that represents a difference between the cycles or edges of the base clock signal counted while the measurement pulse was being received and the number of clock cycles of the transmitter clock signal that defines the pulse duration.
2. The receiving device as described in clause 1, wherein the measurement pulse is received after an associated Manchester-encoded command is received over the one-wire serial bus, and wherein the Manchester-encoded command is received in a datagram configured in accordance with a Radio Frequency Front-End (RFFE) protocol.
3. The receiving device as described in clause 2, wherein the transmitter clock signal is embedded in the Manchester-encoded command.

4. The receiving device as described in any of clauses 1-3, wherein the base clock signal has a frequency that is a multiple of a frequency of the transmitter clock signal.
5. The receiving device as described in any of clauses 1-4, wherein the controller is further configured to increase the count value of the counter when the base clock signal has a frequency that is less than a frequency of the transmitter clock signal.
6. The receiving device as described in any of clauses 1-5, wherein the controller is further configured to decrease the count value of the counter when the base clock signal has a frequency that is greater than a frequency of the transmitter clock signal.
7. The receiving device as described in any of clauses 1-6, further comprising: a trigger shadow register configured by trigger information received in a second transaction conducted over the one-wire serial bus, wherein the counter is configured with an initial count value using timing information received in the second transaction.
8. The receiving device as described in clause 7, wherein the receiving device is one of a plurality of receiving devices coupled to the one-wire serial bus, wherein each of the plurality of receiving devices is configured by trigger and timing information received in the second transaction, and wherein each of the plurality of receiving devices is configured to initiate timing of actuation of a corresponding trigger when the second transaction is terminated.
9. The receiving device as described in any of clauses 1-8, wherein the controller is further configured to periodically adjust the count value of the counter using the correction value when the counter is timing actuation of the trigger.
10. The receiving device as described in clause 9, wherein the controller adjusts the count value of the counter with a periodicity determined by a frequency of the base clock signal.
11. A method for timing triggers in a receiving device, comprising: generating a base clock signal; counting cycles or edges of the base clock signal using a counter of the receiving device while a measurement pulse is received over a one-wire serial bus during a first transaction conducted over the one-wire serial bus, the measurement pulse having a pulse duration defined by a number of clock cycles of a transmitter clock signal; and adjusting a count value of the counter when the counter is timing actuation of a trigger using a correction value that represents a difference between the cycles or edges of the base clock signal counted while the measurement pulse was being received and the number of clock cycles of the transmitter clock signal that defines the pulse duration.
12. The method as described in clause 11, further comprising: receiving a Manchester-encoded command over the one-wire serial bus; and receiving the measurement pulse after the Manchester-encoded command is received, wherein the Manchester-encoded command indicates that the measurement pulse is to be provided, and wherein the Manchester-encoded command is received in a datagram configured in accordance with a Radio Frequency Front-End (RFFE) protocol.
13. The method as described in clause 12, wherein the transmitter clock signal is embedded in the Manchester-encoded command.
14. The method as described in any of clauses 11-13, wherein the base clock signal has a frequency that is a multiple of a frequency of the transmitter clock signal.
15. The method as described in any of clauses 11-14, wherein adjusting the count value of the counter comprises: increasing the count value of the counter when the base clock signal has a frequency that is less than a frequency of the transmitter clock signal.
16. The method as described in any of clauses 11-15, wherein adjusting the count value of the counter comprises: decreasing the count value of the counter when the base clock signal has a frequency that is greater than a frequency of the transmitter clock signal.
17. The method as described in any of clauses 11-16, further comprising: configuring a trigger shadow register using trigger information received in a second transaction conducted over the one-wire serial bus; and configuring the counter with an initial count value using timing information received in the second transaction.
18. The method as described in clause 17, wherein the receiving device is one of a plurality of receiving devices coupled to the one-wire serial bus, wherein each of the plurality of receiving devices is configured by trigger and timing information received in the second transaction, and wherein each of the plurality of receiving devices is configured to initiate timing of actuation of a corresponding trigger when the second transaction is terminated.
19. The method as described in any of clauses 11-18, wherein adjusting the count value of the counter comprises: periodically adjusting the count value of the counter using the correction value when the counter is timing actuation of the trigger.
20. The method as described in clause 19, wherein periodically adjusting the count value of the counter comprises: adjusting the count value of the counter with a periodicity determined by a frequency of the base clock signal.
21. A system, comprising: a host device coupled to a one-wire serial bus; and a plurality of receiving devices coupled to the one-wire serial bus, each of the plurality of receiving devices including: a clock generator circuit configured to generate a base clock signal; and a counter configured to count cycles or edges of a corresponding base clock signal, wherein the host device is configured to: initiate a first transaction to be conducted over the one-wire serial bus; transmit a broadcast command in the first transaction; transmit a measurement pulse in the first transaction and after the broadcast command, the measurement pulse having a pulse duration defined by a number of clock cycles of a transmitter clock signal used by the host device; and receive measured durations of the measurement pulse from each of the plurality of receiving devices, wherein at least one receiving device is configured to use its counter to measure the measurement pulse by counting cycles or edges of its base clock signal while the measurement pulse is transmitted over the one-wire serial bus, and wherein the at least one receiving device is further configured to adjust a count value of its counter when the counter is timing actuation of a trigger using a correction value that represents a difference between the cycles or edges of the base clock signal counted while the measurement pulse was being received and the number of clock cycles of the transmitter clock signal used by the host device.

22. The system as described in clause 21, wherein the broadcast command transmitted in the first transaction is a Manchester-encoded command, and wherein the Manchester-encoded command is transmitted in a datagram configured in accordance with a Radio Frequency Front-End (RFFE) protocol.

23. The system as described in clause 22, wherein the transmitter clock signal is embedded in the Manchester-encoded command.

24. The system as described in any of clauses 21-23, wherein the base clock signal has a frequency that is a multiple of a frequency of the transmitter clock signal.

25. The system as described in any of clauses 21-24, wherein the at least one receiving device is further configured to increase the count value of the counter when the base clock signal has a frequency that is less than a frequency of the transmitter clock signal.

26. The system as described in any of clauses 21-25, wherein the at least one receiving device is further configured to decrease the count value of the counter when the base clock signal has a frequency that is greater than a frequency of the transmitter clock signal.

27. The system as described in any of clauses 21-26, wherein the at least one receiving device comprises: a trigger shadow register configured by trigger information received in a second transaction conducted over the one-wire serial bus, wherein the counter is configured with an initial count value using timing information received in the second transaction.

28. The system as described in clause 27, wherein each of the plurality of receiving devices is configured by trigger and timing information received in the second transaction, and wherein each of the plurality of receiving devices is configured to initiate timing of actuation of a corresponding trigger when the second transaction is terminated.

29. The system as described in any of clauses 21-28, wherein the at least one receiving device is further configured to periodically adjust the count value of the counter using the correction value when the counter is timing actuation of the trigger.

30. The system as described in clause 29, wherein the at least one receiving device adjusts the count value of the counter with a periodicity determined by a frequency of the base clock signal.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A receiving device, comprising:
   trigger activation logic that controls timing and actuation of triggers, and that is configured by a command received over a one-wire serial bus, wherein each trigger is configured to initiate an action by an element of a radio frequency front-end when actuated;
   a clock generator circuit configured to generate a base clock signal;
   a counter configured to count cycles or edges of the base clock signal while a measurement pulse is received over the one-wire serial bus during a first transaction conducted over the one-wire serial bus, the measurement pulse having a pulse duration defined by a number of clock cycles of a transmitter clock signal; and
   a controller configured to adjust a count value of the counter using a slope correction factor that is applied at predefined intervals when the counter is timing actuation of at least one trigger using a correction value that represents a difference between the cycles or edges of the base clock signal counted while the measurement pulse was being received and the number of clock cycles of the transmitter clock signal that defines the pulse duration.

2. The receiving device of claim 1, wherein the measurement pulse is received after an associated Manchester-encoded command is received over the one-wire serial bus, and wherein the Manchester-encoded command is received in a datagram configured in accordance with a Radio Frequency Front-End (RFFE) protocol.

3. The receiving device of claim 1, wherein the base clock signal has a frequency that is a multiple of a frequency of the transmitter clock signal.

4. The receiving device of claim 1, wherein the controller is further configured to increase the count value of the counter when the base clock signal has a frequency that is less than a frequency of the transmitter clock signal.

5. The receiving device of claim 1, wherein the controller is further configured to decrease the count value of the counter when the base clock signal has a frequency that is greater than a frequency of the transmitter clock signal.

6. The receiving device of claim 1, further comprising:
   a trigger shadow register configured by trigger information received in a second transaction conducted over the one-wire serial bus, wherein the counter is configured with an initial count value using timing information received in the second transaction, and wherein trigger-related information is transferred from the trigger shadow register to the element of the radio frequency front-end when a corresponding trigger is actuated.

7. The receiving device of claim 1, wherein the controller is further configured to periodically adjust the count value of the counter using the correction value when the counter is timing actuation of the at least one trigger.

8. The receiving device of claim 2, wherein the transmitter clock signal is embedded in the Manchester-encoded command.

9. The receiving device of claim 6, wherein the receiving device is one of a plurality of receiving devices coupled to the one-wire serial bus, wherein each of the plurality of receiving devices is configured by trigger and timing information received in the second transaction, and wherein each of the plurality of receiving devices is configured to initiate timing of actuation of a corresponding trigger when the second transaction is terminated.

10. The receiving device of claim 7, wherein the controller adjusts the count value of the counter with a periodicity determined by a frequency of the base clock signal.

11. A method for timing triggers in a receiving device, comprising:
generating a base clock signal;
counting cycles or edges of the base clock signal using a counter of the receiving device while a measurement pulse is received over a one-wire serial bus during a first transaction conducted over the one-wire serial bus, the measurement pulse having a pulse duration defined by a number of clock cycles of a transmitter clock signal;
adjusting a count value of the counter using a slope correction factor that is applied at predefined intervals when the counter is timing actuation of a trigger using a correction value that represents a difference between the cycles or edges of the base clock signal counted while the measurement pulse was being received and the number of clock cycles of the transmitter clock signal that defines the pulse duration; and
initiating an action by an element of a radio frequency front-end when the trigger is actuated.

12. The method of claim 11, further comprising:
receiving a Manchester-encoded command over the one-wire serial bus; and
receiving the measurement pulse after the Manchester-encoded command is received, wherein the Manchester-encoded command indicates that the measurement pulse is to be provided, and wherein the Manchester-encoded command is received in a datagram configured in accordance with a Radio Frequency Front-End (RFFE) protocol.

13. The method of claim 11, wherein the base clock signal has a frequency that is a multiple of a frequency of the transmitter clock signal.

14. The method of claim 11, wherein adjusting the count value of the counter comprises:
increasing the count value of the counter when the base clock signal has a frequency that is less than a frequency of the transmitter clock signal.

15. The method of claim 11, wherein adjusting the count value of the counter comprises:
decreasing the count value of the counter when the base clock signal has a frequency that is greater than a frequency of the transmitter clock signal.

16. The method of claim 11, further comprising:
configuring a trigger shadow register using trigger information received in a second transaction conducted over the one-wire serial bus; and
configuring the counter with an initial count value using timing information received in the second transaction, wherein trigger-related information is transferred from the trigger shadow register to the element of the radio frequency front-end when the trigger is actuated.

17. The method of claim 11, wherein adjusting the count value of the counter comprises:
periodically adjusting the count value of the counter using the correction value when the counter is timing actuation of the trigger.

18. The method of claim 12, wherein the transmitter clock signal is embedded in the Manchester-encoded command.

19. The method of claim 16, wherein the receiving device is one of a plurality of receiving devices coupled to the one-wire serial bus, wherein each of the plurality of receiving devices is configured by trigger and timing information received in the second transaction, and wherein each of the plurality of receiving devices is configured to initiate timing of actuation of a corresponding trigger when the second transaction is terminated.

20. The method of claim 17, wherein periodically adjusting the count value of the counter comprises:
adjusting the count value of the counter with a periodicity determined by a frequency of the base clock signal.

21. A system, comprising:
a host device coupled to a one-wire serial bus; and
a plurality of receiving devices coupled to the one-wire serial bus, each of the plurality of receiving devices including:
a clock generator circuit configured to generate a base clock signal; and
a counter configured to count cycles or edges of a corresponding base clock signal,
wherein the host device is configured to:
initiate a first transaction to be conducted over the one-wire serial bus;
transmit a broadcast command in the first transaction;
transmit a measurement pulse in the first transaction and after the broadcast command, the measurement pulse having a pulse duration defined by a number of clock cycles of a transmitter clock signal used by the host device; and
receive measured durations of the measurement pulse from each of the plurality of receiving devices,
wherein at least one receiving device is configured to use its counter to measure the measurement pulse by counting cycles or edges of its base clock signal while the measurement pulse is transmitted over the one-wire serial bus, and
wherein the at least one receiving device is further configured to adjust a count value of its counter using a slope correction factor that is applied at predefined intervals when the counter is timing actuation of a trigger using a correction value that represents a difference between the cycles or edges of the base clock signal counted while the measurement pulse was being received and the number of clock cycles of the transmitter clock signal used by the host device, and initiate an action by an element of a radio frequency front-end when the trigger is actuated.

22. The system of claim 21, wherein the broadcast command transmitted in the first transaction is a Manchester-encoded command, and wherein the Manchester-encoded command is transmitted in a datagram configured in accordance with a Radio Frequency Front-End (RFFE) protocol.

23. The system of claim 21, wherein the base clock signal has a frequency that is a multiple of a frequency of the transmitter clock signal.

24. The system of claim 21, wherein the at least one receiving device is further configured to increase the count value of the counter when the base clock signal has a frequency that is less than a frequency of the transmitter clock signal.

25. The system of claim 21, wherein the at least one receiving device is further configured to decrease the count value of the counter when the base clock signal has a frequency that is greater than a frequency of the transmitter clock signal.

26. The system of claim 21, wherein the at least one receiving device comprises:
a trigger shadow register configured by trigger information received in a second transaction conducted over the one-wire serial bus, wherein the counter is configured with an initial count value using timing information received in the second transaction, wherein trigger-related information is transferred from the trigger shadow register to the element of the radio frequency front-end when the trigger is actuated.

27. The system of claim 21, wherein the at least one receiving device is further configured to periodically adjust the count value of the counter using the correction value when the counter is timing actuation of the trigger.

28. The system of claim 22, wherein the transmitter clock signal is embedded in the Manchester-encoded command.

29. The system of claim 26, wherein each of the plurality of receiving devices is configured by trigger and timing information received in the second transaction, and wherein each of the plurality of receiving devices is configured to initiate timing of actuation of a corresponding trigger when the second transaction is terminated.

30. The system of claim 27, wherein the at least one receiving device adjusts the count value of the counter with a periodicity determined by a frequency of the base clock signal.

* * * * *